(12) United States Patent
Okada et al.

(10) Patent No.: US 11,706,506 B2
(45) Date of Patent: Jul. 18, 2023

(54) IMAGING APPARATUS

(71) Applicant: FUJIFILM Corporation, Tokyo (JP)

(72) Inventors: Kazuyoshi Okada, Saitama (JP); Yasunobu Kishine, Saitama (JP); Atsushi Kawanago, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 23 days.

(21) Appl. No.: 17/528,175

(22) Filed: Nov. 16, 2021

(65) Prior Publication Data

US 2022/0078319 A1  Mar. 10, 2022

Related U.S. Application Data

(63) Continuation of application No. PCT/JP2020/021936, filed on Jun. 3, 2020.

(30) Foreign Application Priority Data

Jun. 11, 2019 (JP) ................................. 2019-108830

(51) Int. Cl.
*H04N 23/45* (2023.01)
*G02B 5/20* (2006.01)
(Continued)

(52) U.S. Cl.
CPC ............... *H04N 23/45* (2023.01); *G02B 5/20* (2013.01); *G02B 5/3025* (2013.01); *H04N 25/135* (2023.01)

(58) Field of Classification Search
CPC .... H04N 23/45; H04N 25/135; H04N 23/125; H04N 23/55; H04N 23/54; G02B 5/20; (Continued)

(56) References Cited

U.S. PATENT DOCUMENTS 8,749,696 B2   6/2014 Goto
8,911,084 B2 * 12/2014 Fernandez Martinez .....................
                                                        A61B 3/103
                                                          351/201
(Continued)

FOREIGN PATENT DOCUMENTS

CN    102289131    12/2011
CN    103234527     8/2013
(Continued)

OTHER PUBLICATIONS

"International Search Report (Form PCT/ISA/210) of PCT/JP2020/021936," dated Aug. 11, 2020, with English translation thereof, pp. 1-5.

(Continued)

*Primary Examiner* — Hung H Lam
(74) *Attorney, Agent, or Firm* — JCIPRNET

(57) ABSTRACT

Provided is an imaging apparatus that captures a multispectral image having a good image quality. An imaging apparatus (1) includes an imaging optical system (10) that includes a pupil region which is split into a plurality of regions including a first pupil region and a second pupil region different from the first pupil region, and a polarization filter which polarizes light beams passing through the first pupil region and the second pupil region in directions different from each other, an imaging element (100) that includes a first pixel which receives the light beam passing through the first pupil region and a second pixel which receives the light beam passing through the second pupil region, and a signal processing unit (200) that processes signals output from the imaging element (100), and outputs at least first image data consisting of an output signal of the first pixel and second image data consisting of an output signal of the second pixel. In the imaging optical system (10), wavelengths of the light beams passing through the (Continued)

first pupil region and the second pupil region are different from each other, and aberration characteristics of regions corresponding to the first pupil region and the second pupil region are different from each other.

12 Claims, 30 Drawing Sheets

(51) Int. Cl.
  *G02B 5/30* (2006.01)
  *H04N 25/13* (2023.01)
(58) Field of Classification Search
  CPC ............. G02B 5/3025; G02B 27/0025; G02B 27/286; G02B 5/201; G02B 26/00
  See application file for complete search history.

(56) References Cited

U.S. PATENT DOCUMENTS

| | | | |
|---|---|---|---|
| 9,118,796 | B2 | 8/2015 | Hiramoto et al. |
| 10,015,390 | B2 | 7/2018 | Fukuda |
| 10,477,099 | B2 | 11/2019 | Fukuda |
| 11,067,772 | B2 | 7/2021 | Fukuda |
| 11,422,335 | B2 | 8/2022 | Fukuda |
| 2004/0195962 | A1* | 10/2004 | Nakamura ............ H10K 50/85 313/506 |
| 2005/0280777 | A1* | 12/2005 | Dai ........................ A61B 3/032 351/205 |
| 2008/0030597 | A1* | 2/2008 | Olsen ................ H01L 27/14621 257/E31.127 |
| 2013/0083172 | A1 | 4/2013 | Baba |
| 2013/0270421 | A1* | 10/2013 | Kanamori ......... H01L 27/14621 250/208.1 |
| 2015/0130962 | A1 | 5/2015 | Hiramoto et al. |
| 2015/0156478 | A1 | 6/2015 | Ono |
| 2016/0094822 | A1 | 3/2016 | Imade |
| 2016/0105659 | A1* | 4/2016 | Hayashi ............. A61B 1/00193 348/47 |
| 2021/0235060 | A1* | 7/2021 | Hirasawa ................. G02B 3/00 |

FOREIGN PATENT DOCUMENTS

| | | |
|---|---|---|
| CN | 103703770 | 4/2014 |
| CN | 105324991 | 2/2016 |
| CN | 107026992 | 8/2017 |
| JP | H088157 | 1/1996 |
| JP | 2004157059 | 6/2004 |
| JP | 2009162847 | 7/2009 |
| JP | 2012247645 | 12/2012 |
| JP | 2013077935 | 4/2013 |
| WO | 2014020791 | 2/2014 |
| WO | 2014024745 | 2/2014 |

OTHER PUBLICATIONS

"Written Opinion of the International Searching Authority (Form PCT/ISA/237)" of PCT/JP2020/021936, dated Aug. 11, 2020, with English translation thereof, pp. 1-6.

Office Action of China Counterpart Application, with English translation thereof, dated Feb. 11, 2023, pp. 1-15.

* cited by examiner

IMAGING APPARATUS

CROSS-REFERENCE TO RELATED APPLICATIONS

The present application is a Continuation of PCT International Application No. PCT/JP2020/021936 filed on Jun. 3, 2020 claiming priority under 35 U.S.C § 119(a) to Japanese Patent Application No. 2019-108830 filed on Jun. 11, 2019. Each of the above applications is hereby expressly incorporated by reference, in its entirety, into the present application.

BACKGROUND OF THE INVENTION

1. Field of the Invention

The present invention relates to an imaging apparatus.

2. Description of the Related Art

WO2014/020791A proposes the technology of using a polarization color filter plate having a plurality of light transmission regions having different polarization characteristics and color characteristics and an imaging element which comprises a plurality of polarization filters having different polarization characteristics and capturing an image of a plurality of wavelength ranges (multispectral image).

SUMMARY OF THE INVENTION

One embodiment according to the technology of the present disclosure provides an imaging apparatus that captures a multispectral image having a good image quality.

(1) An imaging apparatus comprising an imaging optical system that includes a pupil region which is split into a plurality of regions including a first pupil region and a second pupil region different from the first pupil region, and a polarizer which polarizes light beams passing through the first pupil region and the second pupil region in directions different from each other, an imaging element that includes a first pixel which receives the light beam passing through the first pupil region and a second pixel which receives the light beam passing through the second pupil region, and a processor that processes signals output from the imaging element, and outputs at least first image data consisting of an output signal of the first pixel and second image data consisting of an output signal of the second pixel, in which in the imaging optical system, wavelengths of the light beams passing through the first pupil region and the second pupil region are different from each other, and aberration characteristics of regions corresponding to the first pupil region and the second pupil region are different from each other.

(2) The imaging apparatus according to (1), in which in the imaging optical system, amounts of the light beams passing through the first pupil region and the second pupil region are different from each other.

(3) The imaging apparatus according to (1) or (2), in which the imaging optical system includes a first optical element disposed in the first pupil region and a second optical element disposed in the second pupil region, which is different from the first optical element, and aberrations of the regions corresponding to the first pupil region and the second pupil region are individually corrected by the first optical element and the second optical element.

(4) The imaging apparatus according to (3), in which the first optical element transmits a light beam of a first wavelength range, and the second optical element transmits a light beam of a second wavelength range different from the first wavelength range.

(5) The imaging apparatus according to (4), in which the first optical element has a first transmittance, and the second optical element has a second transmittance different from the first transmittance.

(6) The imaging apparatus according to any one of (3) to (5), in which the first optical element has a first aperture area, and the second optical element has a second aperture area different from the first aperture area.

(7) The imaging apparatus according to any one of (3) to (6), in which the first optical element and the second optical element have a lens shape, and in the imaging optical system, curvatures of the first optical element and the second optical element are individually adjusted to individually correct the aberrations of the regions corresponding to the first pupil region and the second pupil region.

(8) The imaging apparatus according to any one of (3) to (6), in which the first optical element and the second optical element have a flat plate shape, and in the imaging optical system, thicknesses of the first optical element and the second optical element are individually adjusted to individually correct the aberrations of the regions corresponding to the first pupil region and the second pupil region.

(9) The imaging apparatus according to any one of (3) to (6), in which the first optical element and the second optical element have a flat plate shape, and in the imaging optical system, inclinations of the first optical element and the second optical element are individually adjusted to individually correct the aberrations of the regions corresponding to the first pupil region and the second pupil region.

(10) The imaging apparatus according to any one of (3) to (6), in which the first optical element and the second optical element have a flat plate shape, and in the imaging optical system, inclinations of one surface of the first optical element and one surface of the second optical element are individually adjusted to individually correct the aberrations of the regions corresponding to the first pupil region and the second pupil region.

(11) The imaging apparatus according to any one of (3) to (10), in which the first optical element and the second optical element are integrated to form one optical element.

(12) The imaging apparatus according to any one of (1) to (11), in which in the imaging optical system, the pupil region is split concentrically.

DESCRIPTION OF THE PREFERRED EMBODIMENTS

Hereinafter, preferred embodiments of the present invention will be described in detail with reference to the accompanying drawings.

First Embodiment

[Basic Configuration of Imaging Apparatus]

Figure 1:
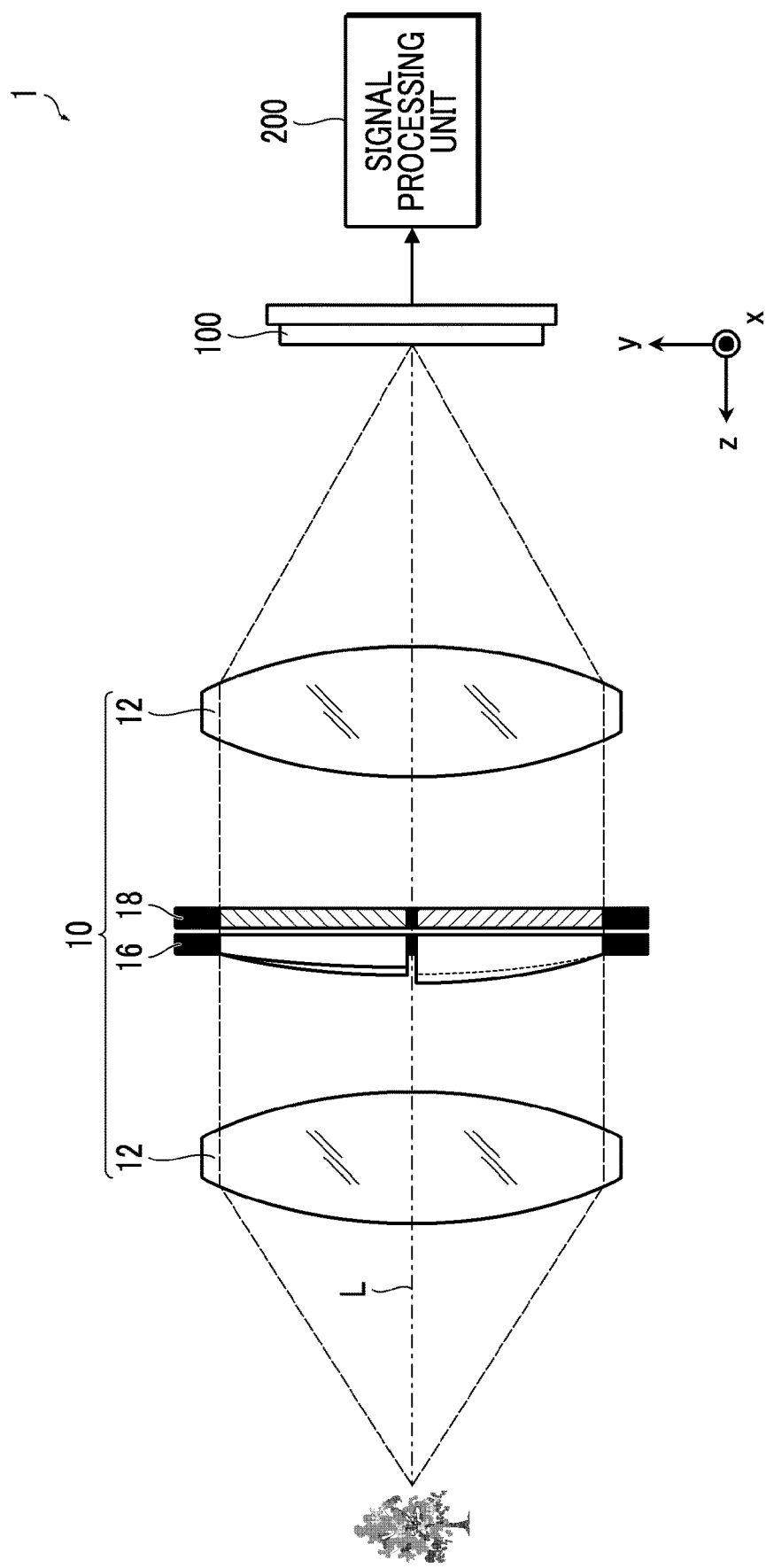
FIG. 1 is a diagram showing a schematic configuration of an imaging apparatus according to a first embodiment of the present invention.

FIG. 1 is a diagram showing a schematic configuration of an imaging apparatus according to a first embodiment of the present invention.

The imaging apparatus according to the present embodiment is an imaging apparatus that captures a multispectral image of four bands. The imaging apparatus according to the present embodiment mainly comprises an imaging optical system 10, an imaging element 100, and a signal processing unit 200.

[Imaging Optical System]

The imaging optical system 10 is composed of a combination of a plurality of lenses 12. The imaging optical system 10 includes a bandpass filter unit 16 and a polarization filter unit 18 in an optical path thereof. In addition, the imaging optical system 10 includes a focus adjustment mechanism (not shown). The focus adjustment mechanism adjusts a focus by, for example, moving the entire imaging optical system 10 back and forth along an optical axis L.

Figure 2:
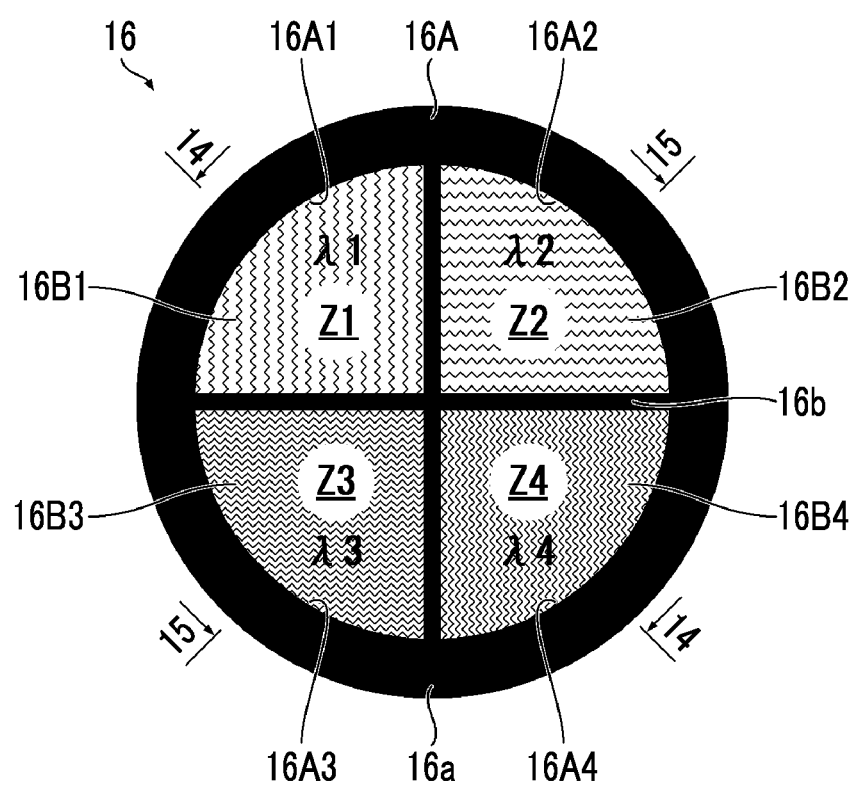
FIG. 2 is a front view of a bandpass filter unit.

FIG. 2 is a front view of the bandpass filter unit.

The bandpass filter unit 16 is configured by a frame 16A comprising four aperture regions 16A1 to 16A4, and four bandpass filters 16B1 to 16B4 provided in the four aperture regions 16A1 to 16A4 of the frame 16A. Note that in the following, if necessary, the aperture regions 16A1 to 16A4 are distinguished from each other by referring the aperture region 16A1 to as a first aperture region 16A1, referring the aperture region 16A2 to as a second aperture region 16A2, referring the aperture region 16A3 to as a third aperture region 16A3, and referring the aperture region 16A4 to as a fourth aperture region 16A4. In addition, the bandpass filters 16B1 to 16B4 are distinguished from each other by referring the bandpass filter 16B1 provided in the first aperture region 16A1 to as a first bandpass filter 16B1, referring the bandpass filter 16B2 provided in the second aperture region 16A2 to as the second bandpass filter 16B2, referring the bandpass filter 16B3 provided in the third aperture region 16A3 to as a third bandpass filter 16B3, and referring the bandpass filter 16B4 provided in the fourth aperture region 16A4 to as a fourth bandpass filter 16B4.

The frame 16A has an annular frame body 16a and a partition 16b that partitions an inside of the frame body 16a. The frame 16A is split an inside of the frame body 16a into four equal parts in a circumferential direction by the cross-shaped partition 16b, and the four aperture regions 16A1 to 16A4 are provided. The frame body 16a configures a stop (aperture stop) of the imaging optical system 10. In the imaging optical system 10, a pupil region is split into four regions Z1 to Z4 by the frame 16A (pupil splitting). Hereinafter, if necessary, the that splitting regions Z1 to Z4 will be referred to as a first pupil region Z1, a second pupil region Z2, a third pupil region Z3, and a fourth pupil region Z4, respectively. The aperture regions 16A1 to 16A4 correspond to the four pupil regions Z1 to Z4 of the imaging optical system 10. That is, the first aperture region 16A1 corresponds to the first pupil region Z1. The second aperture region 16A2 corresponds to the second pupil region Z2. The third aperture region 16A3 corresponds to the third pupil region Z3. The fourth aperture region 16A4 corresponds to the fourth pupil region Z4.

Wavelength ranges of light beams which passes through the pupil regions Z1 to Z4 of the imaging optical system 10 are limited by the bandpass filters 16B1 to 16B4 provided in the aperture regions 16A1 to 16A4. That is, in the first pupil region Z1, the wavelength range of the passing light beam is limited by the first bandpass filter 16B1. In the second pupil region Z2, the wavelength range of the passing light beam is limited by the second bandpass filter 16B2. In the third pupil region Z3, the wavelength range of the passing light beam is limited by the third bandpass filter 16B3. In the fourth pupil region Z4, the wavelength range of the passing light beam is limited by the fourth bandpass filter 16B4. The bandpass filters 16B1 to 16B4 are examples of an optical element.

Figure 3:
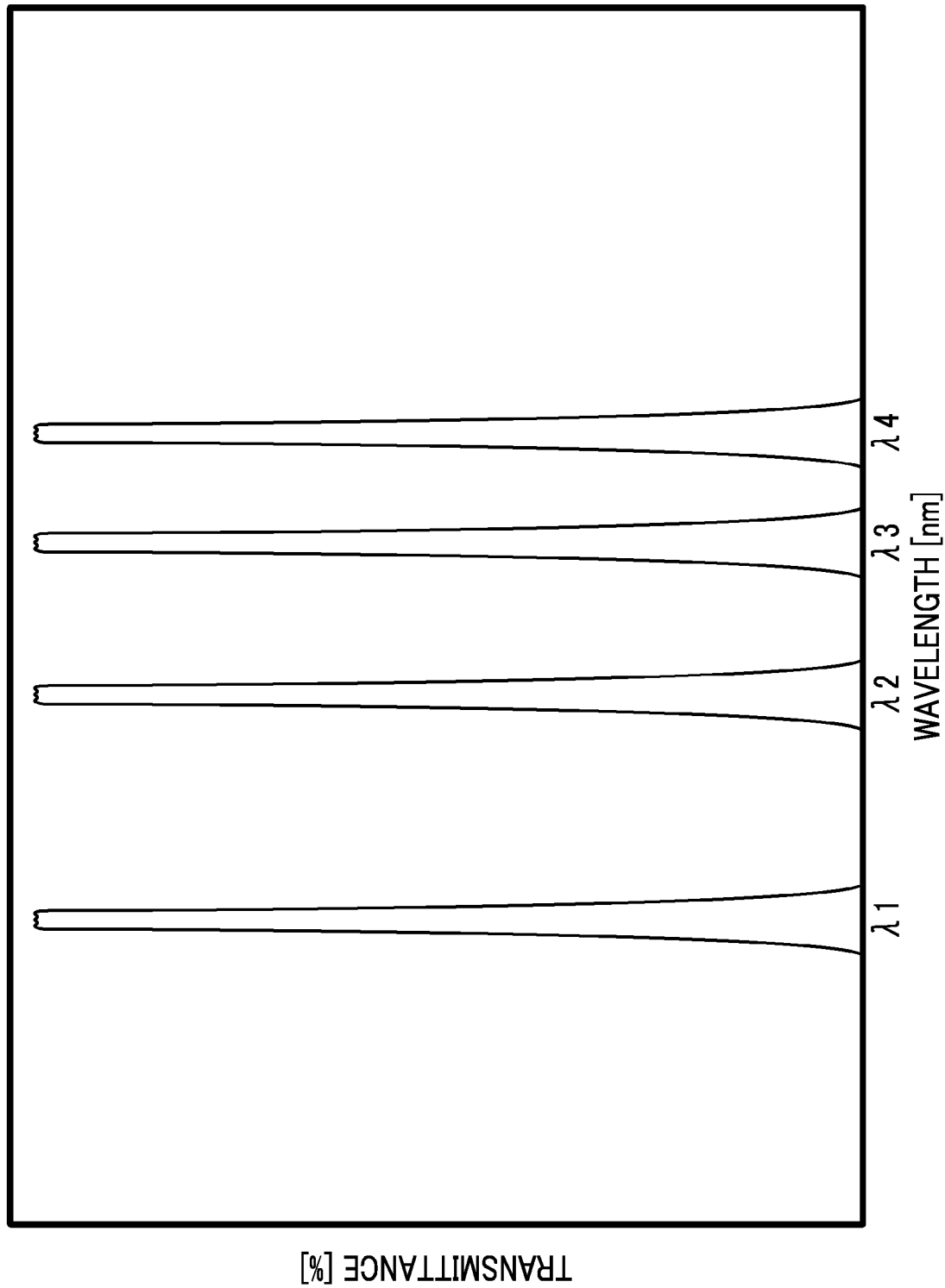
FIG. 3 is a graph showing an example of a transmission wavelength characteristic of each bandpass filter.

FIG. 3 is a graph showing an example of a transmission wavelength characteristic of each bandpass filter.

The bandpass filters 16B1 to 16B4 transmit the light beams of different wavelength ranges. Specifically, the first bandpass filter 16B1 transmits the light beam of a wavelength range $\lambda 1$. The second bandpass filter 16B2 transmits the light beam of a wavelength range $\lambda 2$. The third bandpass filter 16B3 transmits the light beam of a wavelength range $\lambda 3$. The fourth bandpass filter 16B4 transmits the light beam of a wavelength range $\lambda 4$.

In addition, the bandpass filters 16B1 to 16B4 have functions of individually correcting aberrations of regions corresponding to the pupil regions Z1 to Z4. This point will be described in detail below.

With the bandpass filter unit 16 having the configuration described above, in the imaging optical system 10, the wavelengths of the light beams which pass through the regions corresponding to the pupil regions Z1 to Z4 are different from each other.

Figure 4:
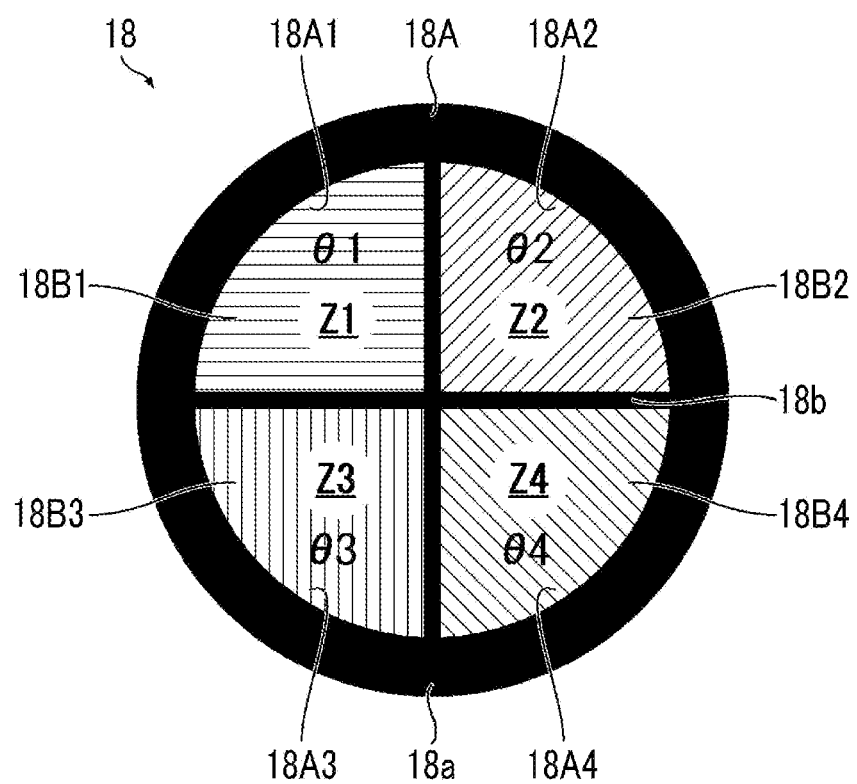
FIG. 4 is a front view of a polarization filter unit.

FIG. 4 is a front view of the polarization filter unit.

The polarization filter unit 18 is configured by a frame 18A comprising the four aperture regions 18A1 to 18A4, and four polarization filters 18B1 to 18B4 provided in the aperture regions 18A1 to 18A4 of the frame 18A. Note that in the following, if necessary, the four aperture regions 18A1 to 18A4 are distinguished from each other by referring the aperture region 18A1 to as a first aperture region 18A1, referring the aperture region 18A2 to as a second aperture region 18A2, referring the aperture region 18A3 to as a third aperture region 18A3, and referring the aperture region 18A4 to as a fourth aperture region 18A4. In addition, the polarization filters 18B1 to 18B4 are distinguished from each other by referring the polarization filter 18B1 provided in the first aperture region 18A1 to as a first polarization filter 18B1, referring the polarization filter 18B2 provided in the second aperture region 18A2 to as a second polarization filter 18B2, referring the polarization filter 18B3 provided in the third aperture region 18A3 to as a third polarization filter 18B3, and referring the polarization filter 18B4 provided in the fourth polarization filter 18B4 to as a fourth aperture region 18A4.

The frame 18A has the same shape as the frame 16A of the bandpass filter unit 16. Therefore, the frame 18A has an annular frame body 18a and a partition 18b. The frame 18A is split an inner peripheral portion of the frame body 18a into four equal parts in a circumferential direction by the cross-shaped partition 18b, and the four aperture regions 18A1 to 18A4 are provided. The aperture regions 18A1 to 18A4 are disposed so as to overlap with the aperture regions 16A1 to 16A4 of the bandpass filter unit 16. That is, the first aperture region 18A1 is disposed so as to overlap with the first aperture region 16A1 of the bandpass filter unit 16. The second aperture region 18A2 is disposed so as to overlap with the second aperture region 16A2 of the bandpass filter unit 16. The third aperture region 18A3 is disposed so as to overlap with the third aperture region 16A3 of the bandpass filter unit 16. The fourth aperture region 18A4 is disposed so as to overlap with the fourth aperture region 16A4 of the bandpass filter unit 16. Therefore, the light beam, which passes through the first aperture region 16A1 of the bandpass filter unit 16, passes through the first aperture region 18A1 of the polarization filter unit 18. In addition, the light beam, which passes through the second aperture region 16A2 of the bandpass filter unit 16, passes through the second aperture region 18A2 of the polarization filter unit 18. In addition, the light beam, which passes through the third aperture region 16A3 of the bandpass filter unit 16, passes through the third aperture region 18A3 of the polarization filter unit 18. In addition, the light beam, which passes through the fourth aperture region 16A4 of the bandpass filter unit 16, passes through the fourth aperture region 18A4 of the polarization filter unit 18.

The polarization filters 18B1 to 18B4 provided in the aperture regions 18A1 to 18A4 transmit the light beams of polarization directions different from each other. Specifically, the first polarization filter 18B1 provided in the first aperture region 18A1 transmits the light beam of a polarization direction $\theta 1$ (for example, $\theta 1=0°$). The second polarization filter 18B2 provided in the second aperture region 18A2 transmits the light beam of a polarization direction $\theta 2$ (for example, $\theta 2=45°$). The third polarization filter 18B3 provided in the third aperture region 18A3 transmits the light beam of a polarization direction $\theta 3$ (for example, $\theta 3=90°$). The fourth polarization filter 18B4 provided in the fourth aperture region 18A4 transmits the light beam of a polarization direction $\theta 4$ (for example, $\theta 4=135°$). Therefore, the light beam, which passes through the first pupil region Z1, is polarized in the polarization direction $\theta 1$, the light beam, which passes through the second pupil region Z2, is polarized in the polarization direction $\theta 2$, the light beam, which passes through the third pupil region Z3, is polarized in the polarization direction $\theta 3$, and the light beam, which passes through the fourth pupil region Z4, is polarized in the polarization direction $\theta 4$. The polarization filters 18B1 to 18B4 are examples of a polarizer.

According to the imaging optical system 10 having the configuration described above, the light beams having different characteristics are emitted from the regions corresponding to the pupil regions Z1 to Z4. That is, the light beam (first light beam) of the polarization direction $\theta 1$ and the wavelength range $\lambda 1$, the light beam (second light beam) of the polarization direction $\theta 2$ and the wavelength range $\lambda 2$, the light beam (third light beam) of the polarization direction $\theta 3$ and the wavelength range $\lambda 3$, and the light beam (fourth light beam) of the polarization direction $\theta 4$ and the wavelength range $\lambda 4$ are emitted. The first light beam is the light beam which passes through the pupil region Z1 and is the light beam which passes through the first bandpass filter 16B1 and the first polarization filter 18B1. The second light beam is the light beam which passes through the pupil region Z2, and is the light beam which passes through the second bandpass filter 16B2 and the second polarization filter 18B2. The third light beam is the light beam which passes through the pupil region Z3, and is the light beam which passes through the third bandpass filter 16B3 and the third polarization filter 18B3. The fourth light beam is the light beam which passes through the pupil region Z4, and is the light beam which passes through the fourth bandpass filter 16B4 and the fourth polarization filter 18B4.

[Imaging Element]

Figure 5:
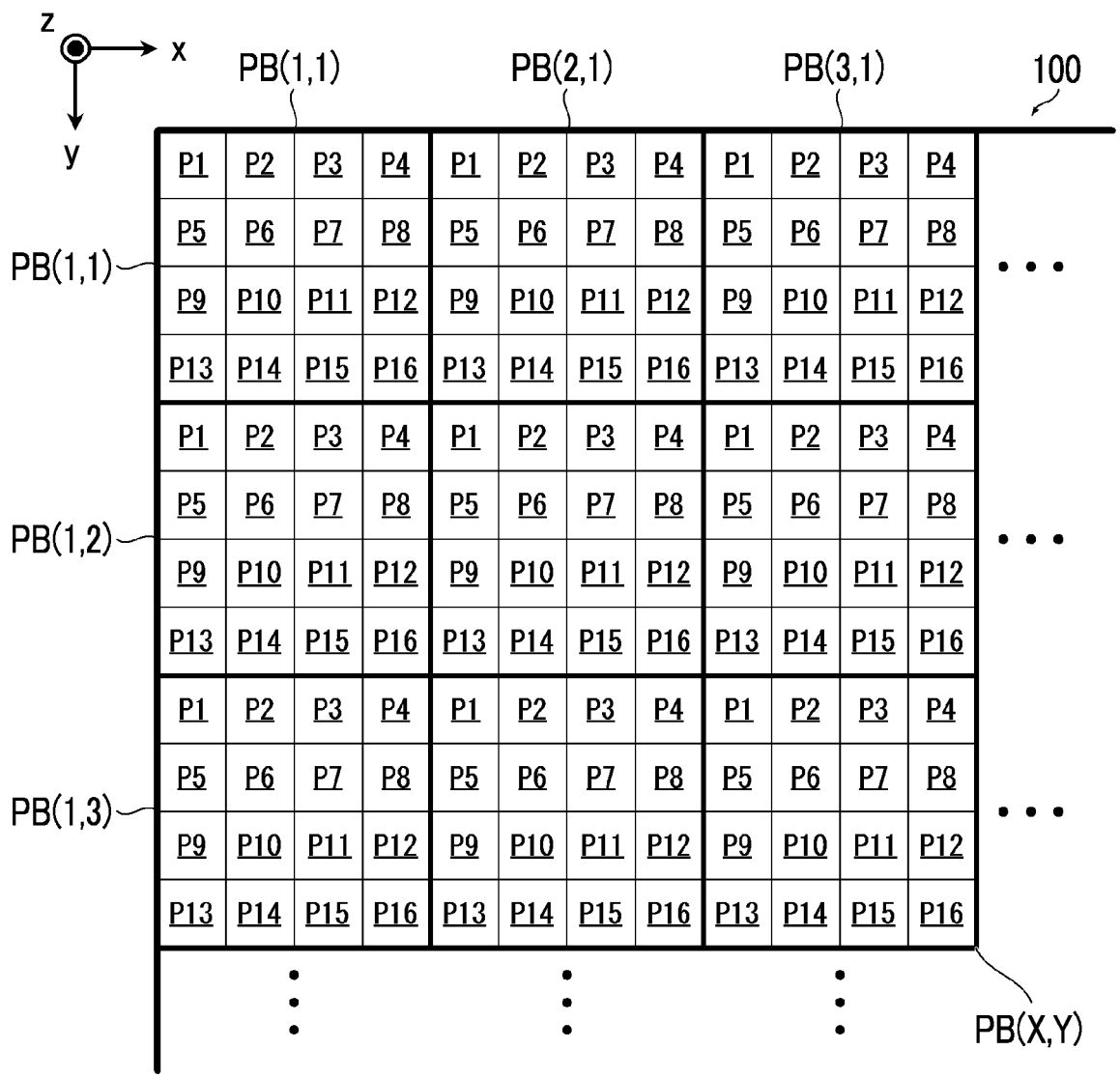
FIG. 5 is a diagram showing a schematic configuration of an arrangement of pixels of an imaging element.

FIG. 5 is a diagram showing a schematic configuration of an arrangement of pixels of the imaging element.

As shown in FIG. 5, the imaging element 100 has a plurality of types of pixels P1 to P16 on a light-receiving surface thereof. The pixels P1 to P16 are regularly arranged at a certain pitch along a horizontal direction (x-axis direction) and a vertical direction (y-axis direction).

In the imaging element 100 according to the present embodiment, one pixel block PB (X, Y) is configured by sixteen (4×4) adjacent pixels P1 to P16, and the pixel blocks PB (X, Y) are regularly arranged along the horizontal direction (x-axis direction) and the vertical direction (y-axis direction). Hereinafter, if necessary, the pixels P1 to P16 are distinguished from each other by referring the pixel P1 to as the first pixel P1, referring the pixel P2 to as the second pixel P2, referring the pixel P3 to as the third pixel P3, referring the pixel P4 to as the fourth pixel P4, referring the pixel P5 to as the fifth pixel P5, referring the pixel P6 to as the sixth pixel P6, referring the pixel P7 to as the seventh pixel P7, referring the pixel P8 to as the eighth pixel P8, referring the pixel P9 to as the ninth pixel P9, referring the pixel P10 to as a tenth pixel P10, referring the pixel P11 to as an eleventh pixel P11, referring the pixel P12 to as a twelfth pixel P12, referring the pixel P13 to as a thirteenth pixel P13, referring the pixel P14 to as a fourteenth pixel P14, referring the pixel P15 to as a fifteenth pixel P15, and referring the pixel P16 to as a sixteenth pixel P16. The pixels P1 to P16 have different optical characteristics.

Figure 6:
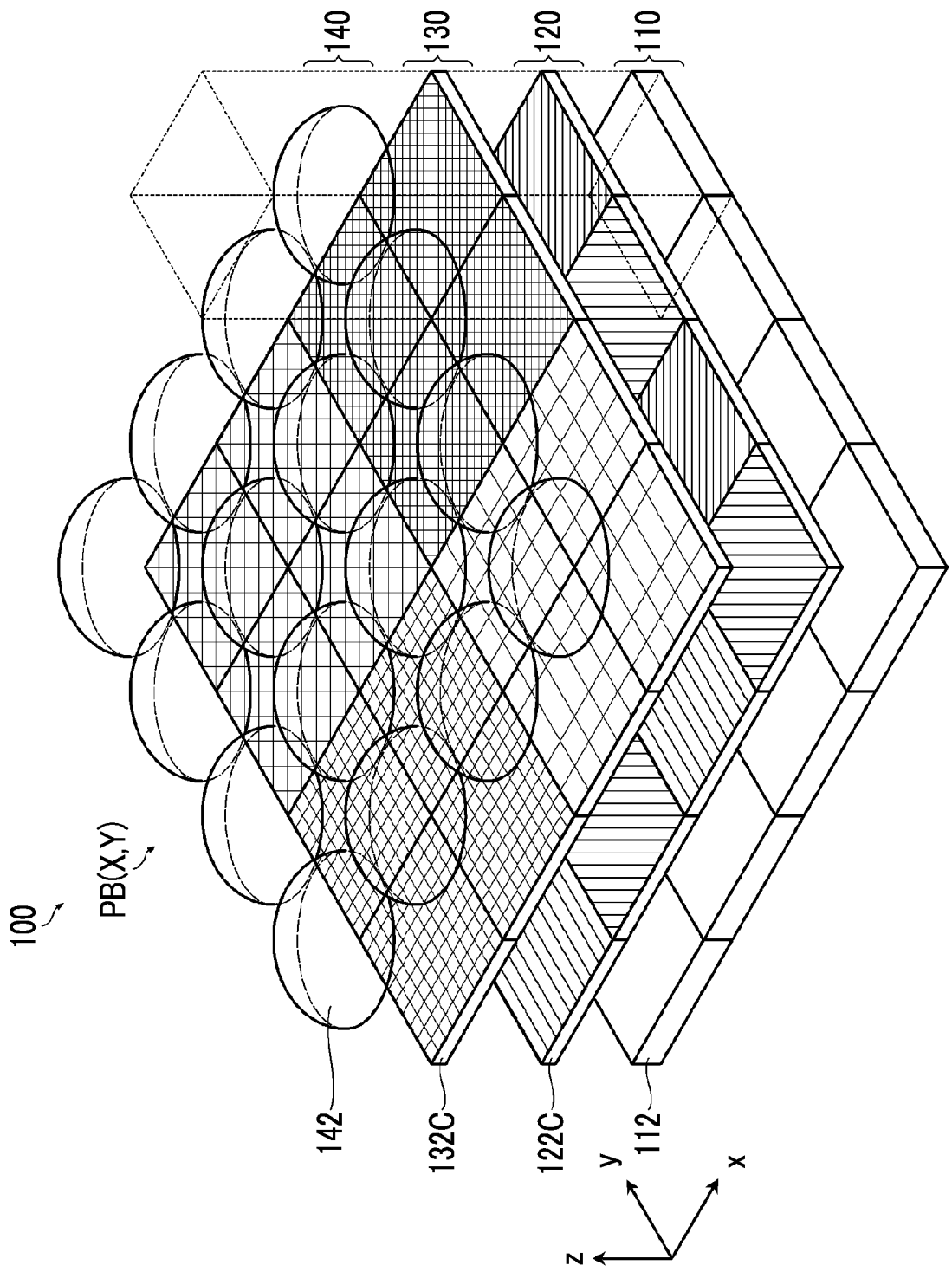
FIG. 6 is a diagram showing a schematic configuration of the imaging element.
Figure 7:
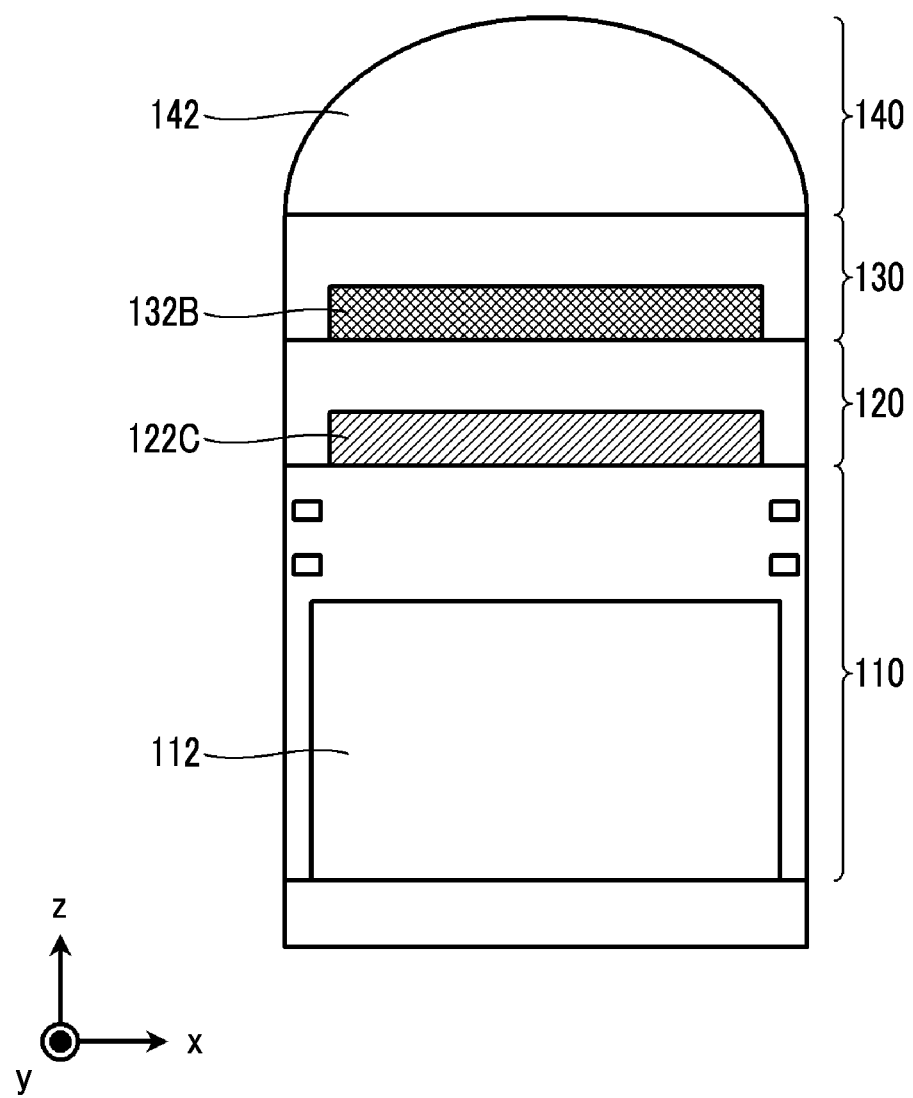
FIG. 7 is a cross-sectional view showing a schematic configuration of one pixel.

FIG. 6 is a diagram showing a schematic configuration of the imaging element. In addition, FIG. 7 is a cross-sectional view showing a schematic configuration of one pixel (broken line portion in FIG. 6).

The imaging element 100 includes a pixel array layer 110, a polarization filter element array layer 120, a spectral filter element array layer 130, and a micro lens array layer 140. The layers are disposed in the order of the pixel array layer 110, the polarization filter element array layer 120, the spectral filter element array layer 130, and the micro lens array layer 140 from an image plane side to an object side.

The pixel array layer 110 is configured by two-dimensionally arranging a large number of photodiodes 112. One photodiode 112 configures one pixel. The photodiodes 112 are regularly arranged along the horizontal direction (x-axis direction) and the vertical direction (y-axis direction).

The polarization filter element array layer 120 is configured by two-dimensionally arranging four types of the polarization filter elements 122A to 122D having different polarization directions of the transmitted light beams. Hereinafter, if necessary, the polarization filter elements 122A to 122D are distinguished from each other by referring the polarization filter element 122A to as a first polarization filter element 122A, referring the polarization filter element 122B to as a second polarization filter element 122B, referring the polarization filter element 122C to as a third polarization filter element 122C, and referring the polarization filter element 122D to as a fourth polarization filter element 122D.

The polarization filter elements 122A to 122D are arranged at the same intervals as the photodiodes 112, and each of which is provided for each pixel. The polarization filter elements 122A to 122D are regularly arranged in each pixel block PB (X, Y).

Figure 8:
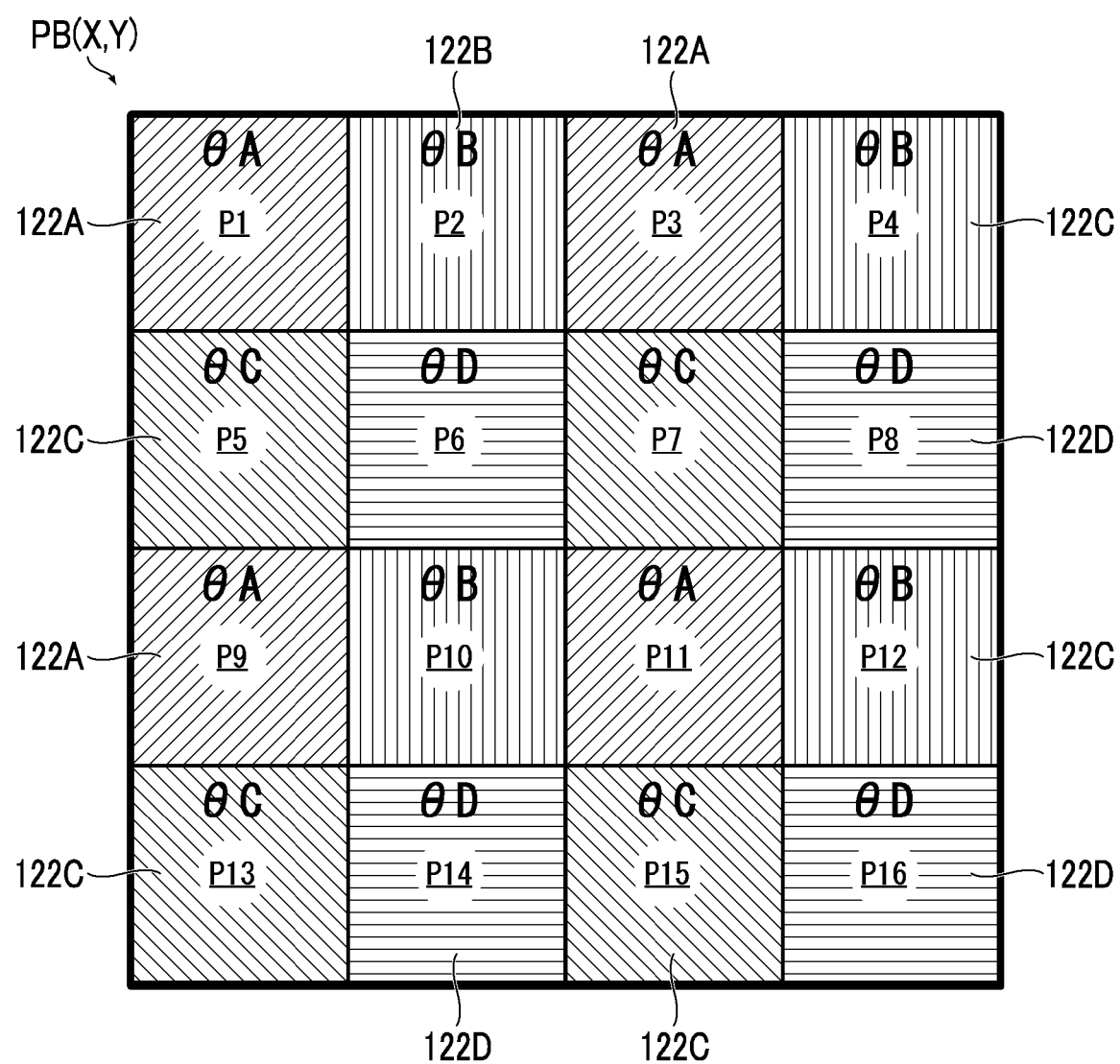
FIG. 8 is a diagram showing an example of an arrangement pattern of polarization filter elements in one pixel block.

FIG. 8 is a diagram showing an example of an arrangement pattern of the polarization filter elements in one pixel block.

As shown in FIG. 8, in the imaging apparatus 1 according to the present embodiment, the first pixel P1, the third pixel P3, the ninth pixel P9, and the eleventh pixel P11 comprise the first polarization filter element 122A. In addition, the second pixel P2, the fourth pixel P4, the tenth pixel P10, and the twelfth pixel P12 comprise the second polarization filter element 122B. In addition, the third pixel P3, the seventh pixel P7, the thirteenth pixel P13, and the fifteenth pixel P15 comprise the third polarization filter element 122C. In addition, the fourth pixel P4, the eighth pixel P8, the fourteenth pixel P14, and the sixteenth pixel P16 comprise the fourth polarization filter element 122D.

The polarization filter elements 122A to 122D transmit the light beams of polarization directions different from each other. Specifically, the first polarization filter element 122A transmits the light beam of the polarization direction θA (for example, θA=45°). The second polarization filter element 122B transmits the light beam of the polarization direction θB (for example, θB=90°). The third polarization filter element 122C transmits the light beam of the polarization direction θC (for example, θC=135°). The fourth polarization filter element 122D transmits the light beam of the polarization direction θD (for example, θD=0°).

The spectral filter element array layer 130 is configured by two-dimensionally arranging four types of the spectral filter elements 132A to 132D having different transmission wavelength characteristics. Hereinafter, if necessary, the spectral filter elements 132A to 132D are distinguished from each other by referring the spectral filter element 132A to as a first spectral filter element 132A, referring the spectral filter element 132B to as a second spectral filter element 132B, referring the spectral filter element 132C to as a third spectral filter element 132C, and referring the spectral filter element 132D to as a fourth spectral filter element 132D.

The spectral filter elements 132A to 132D are arranged at the same intervals as the photodiodes 112, and each of which is provided for each pixel. The spectral filter elements 132A to 132D are regularly arranged in each pixel block PB (X, Y).

Figure 9:
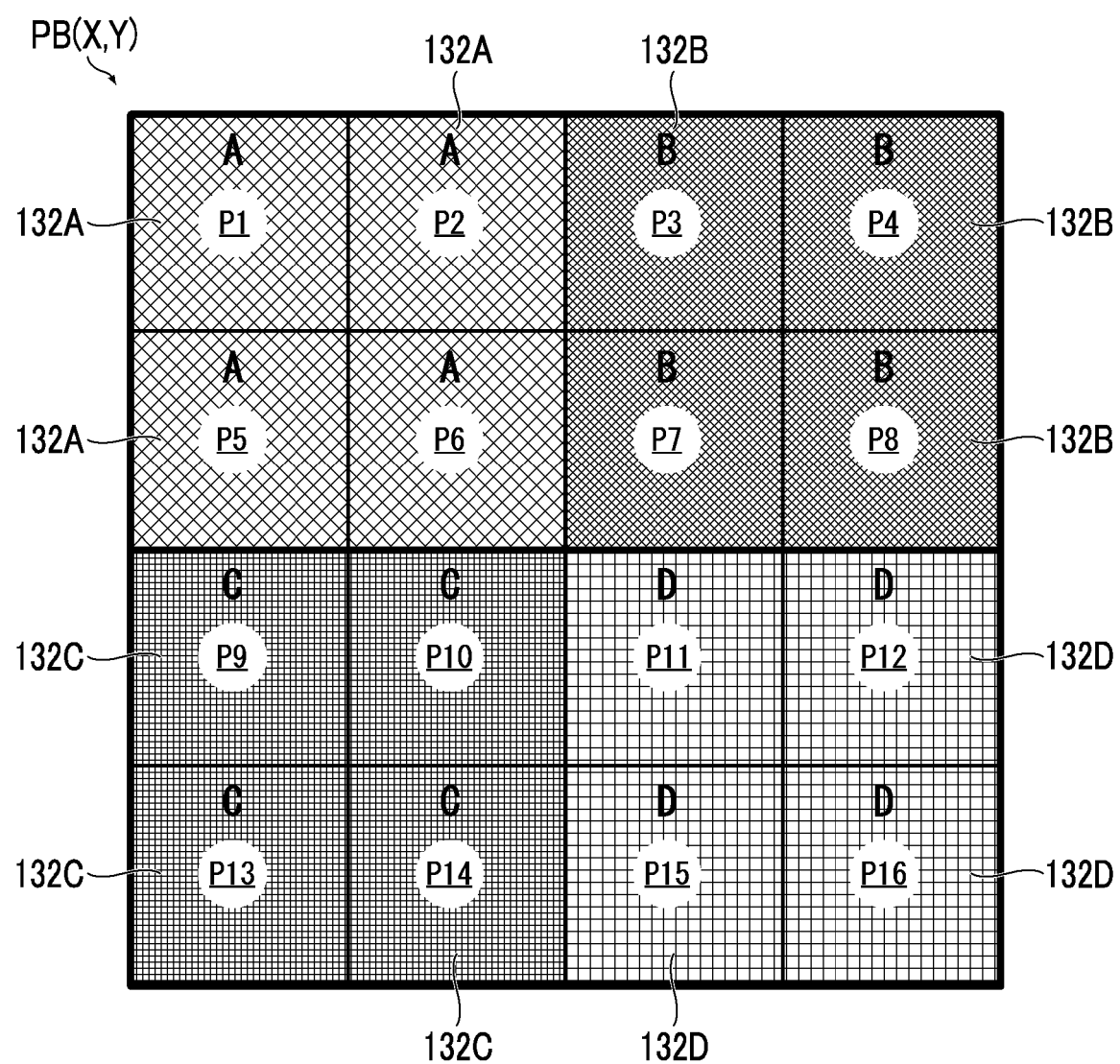
FIG. 9 is a diagram showing an example of an arrangement pattern of spectral filter elements in one pixel block.

FIG. 9 is a diagram showing an example of an arrangement pattern of the spectral filter elements in one pixel block.

As shown in FIG. 9, in the imaging apparatus according to the present embodiment, the first pixel P1, the second pixel P2, the fifth pixel P5, and the sixth pixel P6 comprise the first spectral filter element 132A. In addition, the third pixel P3, the fourth pixel P4, the seventh pixel P7, and the eighth pixel P8 comprise the second spectral filter element 132B. In addition, the ninth pixel P9, the tenth pixel P10, the thirteenth pixel P13, and the fourteenth pixel P14 comprise the third spectral filter element 132C. In addition, the eleventh pixel P11, the twelfth pixel P12, the fifteenth pixel P15, and the sixteenth pixel P16 comprise the fourth spectral filter element 132D.

Figure 10:
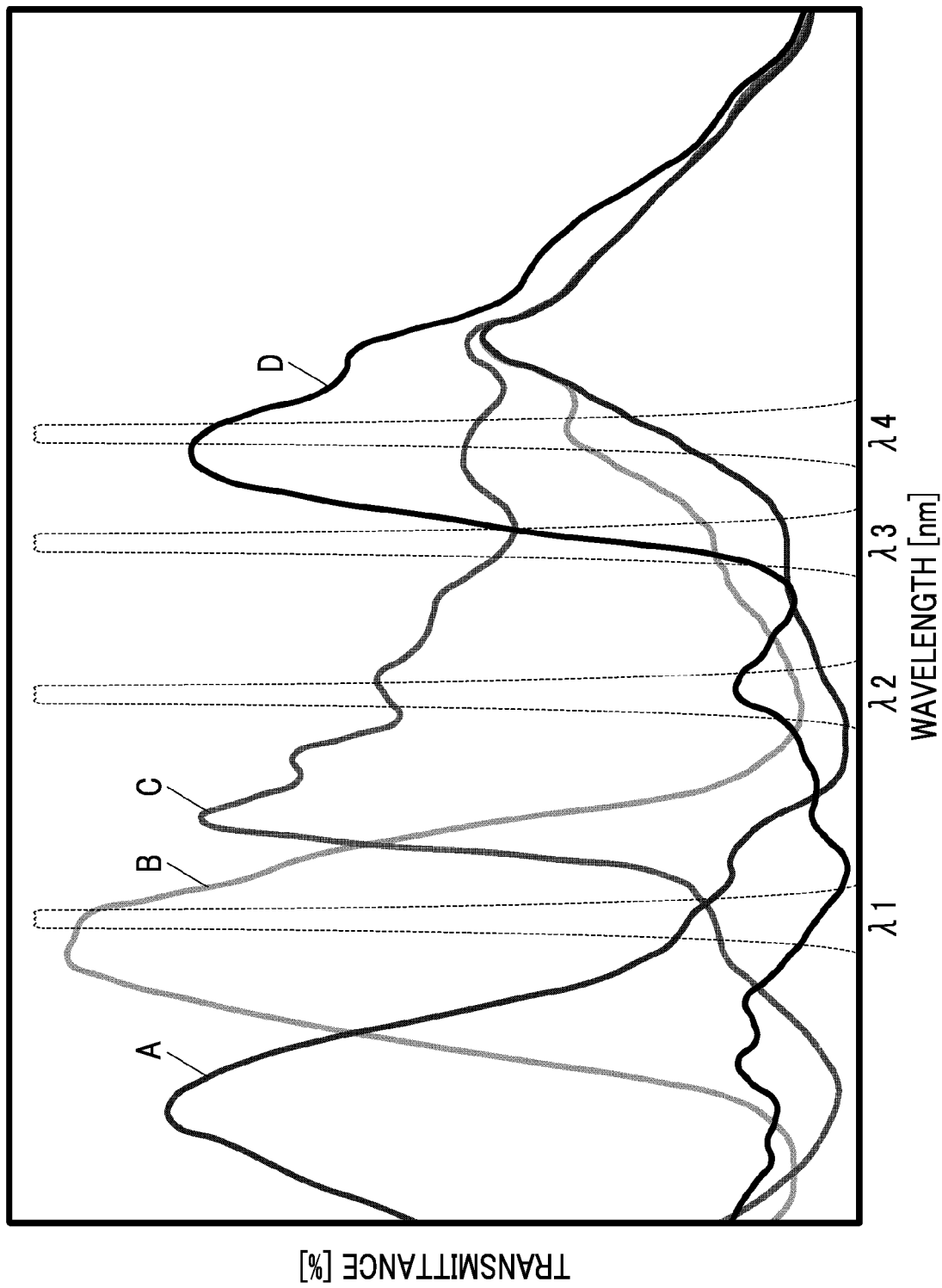
FIG. 10 is a graph showing an example of a transmission wavelength characteristic of a spectral filter element.

FIG. 10 is a graph showing an example of the transmission wavelength characteristic of each spectral filter element.

In FIG. 10, A shows the transmission wavelength characteristic of the first spectral filter element 132A. B shows the transmission wavelength characteristic of the second spectral filter element 132B. C shows the transmission wavelength characteristic of the third spectral filter element 132C. D shows the transmission wavelength characteristic of the fourth spectral filter element 132D. The spectral filter elements 132A to 132D have transmission wavelength characteristics different from each other.

Note that FIG. 10 shows an example a case in which the first spectral filter element 132A is configured by the spectral filter element which transmits a blue (B) light beam, the second spectral filter element 132B is configured by the spectral filter element which transmits a green (G) light beam, the third spectral filter element 132C is configured by the spectral filter element which transmits a red (R) light beam, and the fourth spectral filter element 132D is configured by the spectral filter element which transmits an infrared (IR) light beam.

Here, as shown in FIG. 10, the wavelength ranges λ1 to λ4 of the light beams transmitted through the bandpass filters 16B1 to 16B4 of the imaging optical system 10 are set within ranges of transmission wavelength ranges of the spectral filter elements 132A to 132D. That is, the wavelength ranges λ1 to λ4 of the light beams transmitted through the bandpass filters 16B1 to 16B4 of the imaging optical system 10 are set in the regions of which the transmission wavelength ranges of the spectral filter elements 132A to 132D overlap with each other. Stated another way, the transmission wavelength ranges of the spectral filter elements 132A to 132D are set so as to cover the transmission wavelength ranges of the bandpass filters 16B1 to 16B4 of the imaging optical system 10. Therefore, each of the spectral filter elements 132A to 132D uses a filter which transmits a light beam of a wide range.

The micro lens array layer 140 is configured by two-dimensionally arranging a large number of micro lenses 142. The micro lenses 142 are arranged at the same intervals as the photodiodes 112, and each of which is provided for each pixel. The micro lenses 142 are provided for a purpose of efficiently condensing the light beams from the imaging optical system 10 on the photodiodes 112.

In the imaging element 100 configured as described above, in each pixel block PB (X, Y), each of the pixels P1 to P16 receives the light beam from the imaging optical system 10 as follows. That is, the first pixel P1 receives the light beams from the imaging optical system 10 via the first spectral filter element 132A (transmission wavelength characteristic A) and the first polarization filter element 122A (polarization direction θA). In addition, the second pixel P2 receives the light beams from the imaging optical system 10 via the first spectral filter element 132A (transmission wavelength characteristic A) and the second polarization filter element 122B (polarization direction θB). In addition, the third pixel P3 receives the light beams from the imaging optical system 10 via the second spectral filter element 132B (transmission wavelength characteristic B) and the first polarization filter element 122A (polarization direction θA). In addition, the fourth pixel P4 receives the light beams from the imaging optical system 10 via the second spectral filter element 132B (transmission wavelength characteristic B) and the second polarization filter element 122B (polarization direction θB). In addition, the fifth pixel P5 receives the light beams from the imaging optical system 10 via the first spectral filter element 132A (transmission wavelength characteristic A) and the third polarization filter element 122C (polarization direction θC). In addition, the sixth pixel P6 receives the light beams from the imaging optical system 10 via the first spectral filter element 132A (transmission wavelength characteristic A) and the fourth polarization filter element 122D (polarization direction θD). In addition, the seventh pixel P7 receives the light beams from the imaging optical system 10 via the second spectral filter element 132B (transmission wavelength characteristic B) and the third polarization filter element 122C (polarization direction θC). In addition, the eighth pixel P8 receives the light beams from the imaging optical system 10 via the second spectral filter element 132B (transmission wavelength characteristic B) and the fourth polarization filter element 122D (polarization direction θD). In addition, the ninth pixel P9 receives the light beams from the imaging optical system 10 via the third spectral filter element 132C (transmission wavelength characteristic C) and the first polarization filter element 122A (polarization direction θA). In addition, the tenth pixel P10 receives the light beams from the imaging optical system 10 via the third spectral filter element 132C (transmission wavelength characteristic C) and the second polarization filter element 122B (polarization direction θB). In addition, the eleventh pixel P11 receives the light beams from the imaging optical system 10 via the fourth spectral filter element 132D (transmission wavelength characteristic D) and the first polarization filter element 122A (polarization direction θA). In addition, the twelfth pixel P12 receives the light beams from the imaging optical system 10 via the fourth spectral filter element 132D (transmission wavelength characteristic D) and the second polarization filter element 122B (polarization direction θB). In addition, the thirteenth pixel P13 receives the light beams from the imaging optical system 10 via the third spectral filter element 132C (transmission wavelength characteristic C) and the third polarization filter element 122C (polarization direction θC). In addition, the fourteenth pixel P14 receives the light beams from the imaging optical system 10 via the third spectral filter element 132C (transmission wavelength characteristic C) and the fourth polarization filter element 122D (polarization direction θD). In addition, the fifteenth pixel P15 receives the light beams from the imaging optical system 10 via the fourth spectral filter element 132D (transmission wavelength characteristic D) and the third polarization filter element 122C (polarization direction θC). In addition, the sixteenth pixel P16 receives the light beams from the imaging optical system 10 via the fourth spectral filter element 132D (transmission wavelength characteristic D) and the fourth polarization filter element 122D (polarization direction θD). In this way, the pixels P1 to P16 receive the light beams having different characteristics, respectively, by having different optical characteristics from each other. That is, the pixels P1 to P16 receive the light beams of different wavelength ranges and polarization directions.

[Signal Processing Unit]

The signal processing unit 200 processes the signals output from the imaging element 100 to generate image data of the multispectral image of four bands. That is, the image data of four types of the wavelength ranges λ1 to λ4 transmitted through the bandpass filter unit 16 of the imaging optical system 10 are generated.

Figure 11:
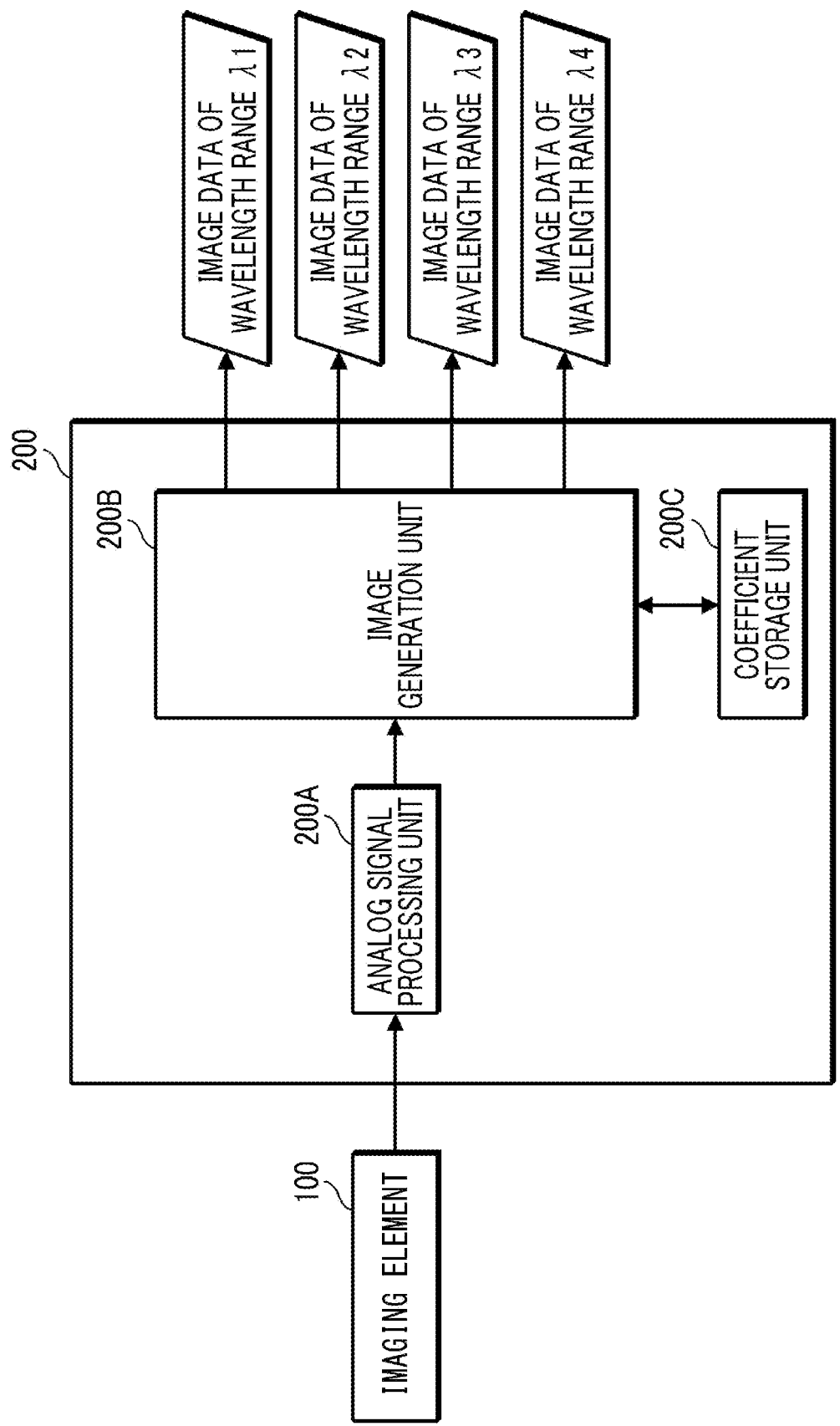
FIG. 11 is a block diagram showing a schematic configuration of a signal processing unit.

FIG. 11 is a block diagram showing a schematic configuration of the signal processing unit.

As shown in FIG. 11, the signal processing unit 200 includes an analog signal processing unit 200A, an image generation unit 200B, and a coefficient storage unit 200C.

The analog signal processing unit 200A takes in an analog pixel signal output from each pixel of the imaging element 100, performs predetermined signal processing (for example, sampling two correlation pile processing, amplification processing, and the like), converts the processed pixel signal into a digital signal, and the outputs the converted digital signal.

The image generation unit 200B performs predetermined signal processing on the pixel signal after being converted into the digital signal to generate the image data of each of the wavelength ranges λ1 to λ4.

Figure 12:
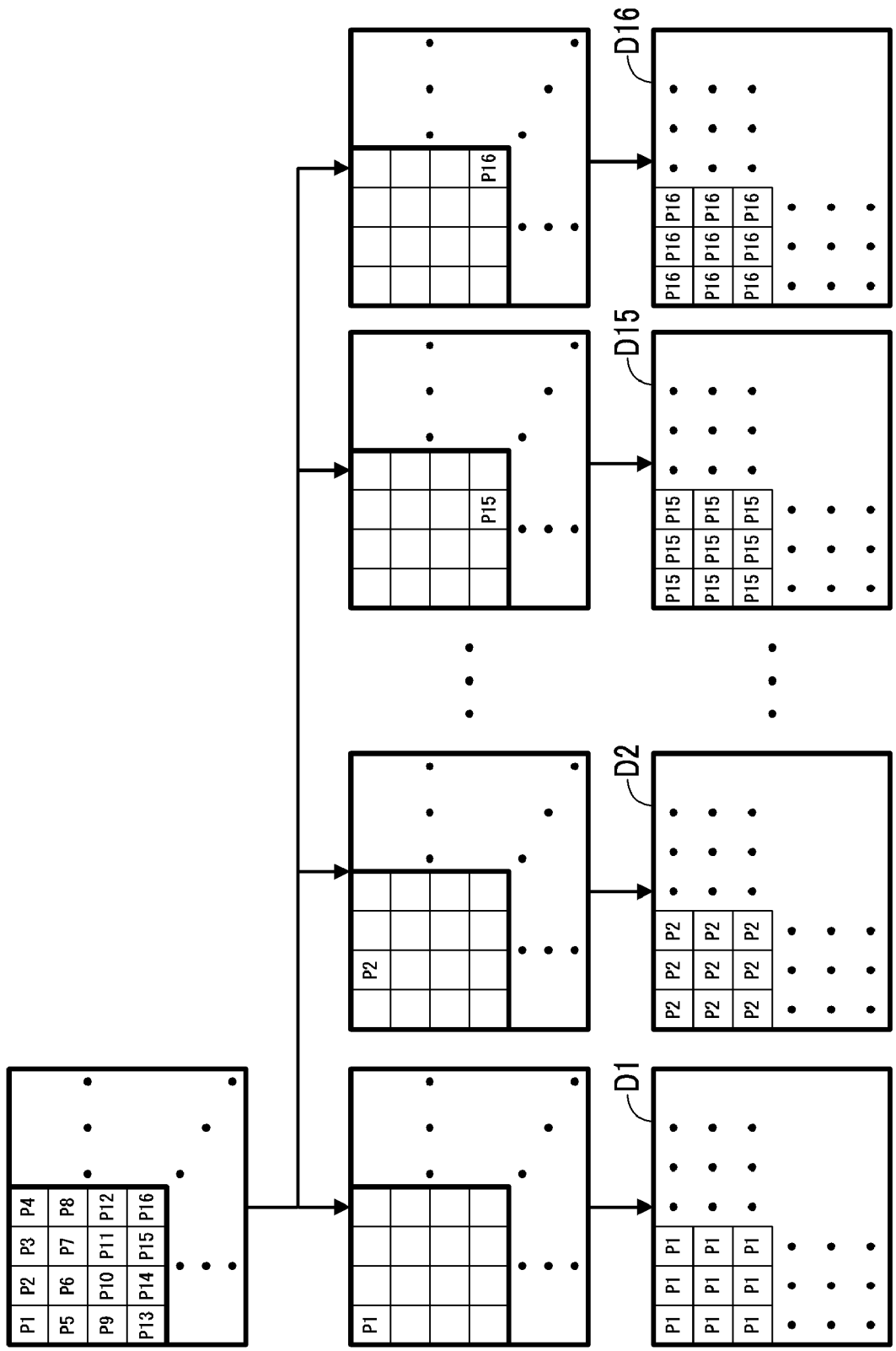
FIG. 12 is a conceptual diagram of image generation.

FIG. 12 is a conceptual diagram of image generation.

Each pixel block PB (X, Y) includes sixteen pixels P1 to P16. Therefore, sixteen image data D1 to D16 are generated by separating and extracting the pixel signals of the pixels P1 to P16 from each pixel block PB (X, Y). However, interference (crosstalk) has occurred in these sixteen image data D1 to D16. That is, since the light beam of each wavelength range is incident on each of the pixels P1 to P16, the generated image is an image in which images of the wavelength ranges are mixed at a predetermined ratio. Therefore, the image generation unit 200B performs interference removal processing to generate the image data of each wavelength range.

Hereinafter, the interference removal processing performed by the signal processing unit 200 will be described.

In each pixel block PB (X, Y), the pixel signal (signal value) obtained from the first pixel P1 is referred to as $\alpha 1$, the pixel signal obtained from the second pixel P2 is referred to as $\alpha 2$, the pixel signal obtained from the third pixel P3 is referred to as $\alpha 3$, the pixel signal obtained from the fourth pixel P4 is referred to as $\alpha 4$, the pixel signal (signal value) obtained from the fifth pixel P5 is referred to as $\alpha 5$, the pixel signal obtained from the sixth pixel P6 is referred to as $\alpha 6$, the pixel signal obtained from the seventh pixel P7 is referred to as $\alpha 7$, the pixel signal obtained from the eighth pixel P8 is referred to as $\alpha 8$, the pixel signal (signal value) obtained from the ninth pixel P9 is referred to as $\alpha 9$, the pixel signal (signal value) obtained from the tenth pixel P10 is referred to as $\alpha 10$, the pixel signal (signal value) obtained from the eleventh pixel P11 is referred to as $\alpha 11$, the pixel signal obtained from the twelfth pixel P12 is referred to as $\alpha 12$, the pixel signal obtained from the thirteenth pixel P13 is referred to as $\alpha 13$, the pixel signal obtained from the fourteenth pixel P14 is referred to as $\alpha 14$, the pixel signal (signal value) obtained from the fifteenth pixel P15 is referred to as $\alpha 15$, and the pixel signal obtained from the sixteenth pixel P16 is referred to as $\alpha 16$. From each pixel block PB (X, Y), the sixteen pixel signals $\alpha 1$ to $\alpha 16$ can be obtained. The image generation unit 200B calculates the four pixel signals $\beta 1$ to $\beta 4$ corresponding to the light beams of the wavelength ranges $\lambda 1$ to $\lambda 4$ from the sixteen pixel signals $\alpha 1$ to $\alpha 16$, and removes interference. Specifically, the image generation unit 200B calculates the four pixel signals $\beta 1$ to $\beta 4$ corresponding to the light beams of the wavelength ranges $\lambda 1$ to $\lambda 4$ are calculated by Equation 1 using the following matrix A, and removes the interference.

Note that the pixel signal $\beta 1$ is the pixel signal corresponding to the light beam of the wavelength range $\lambda 1$, the pixel signal $\beta 2$ is the pixel signal corresponding to the light beam of the wavelength range $\lambda 2$, the pixel signal $\beta 3$ is the pixel signal corresponding to the light beam of the wavelength range $\lambda 3$, and the pixel signal $\beta 4$ is the pixel signal corresponding to the light beam of the wavelength range $\lambda 4$. Therefore, the image data of the wavelength range $\lambda 1$ is generated from the pixel signal $\beta 1$, the image data of the wavelength range $\lambda 2$ is generated from the pixel signal $\beta 2$, the image data of the wavelength range $\lambda 3$ is generated from the pixel signal $\beta 3$, and the image data of the wavelength range $\lambda 4$ is generated from the pixel signal $\beta 4$. Hereinafter, the reason why the interference can be removed by Equation 1 will be described.

The interference occurs by the light beam of each of the wavelength ranges $\lambda 1$ to $\lambda 4$ mixed into each of the pixels P1 to P16. A ratio (interference ratio) at which the light beam of each of the wavelength ranges $\lambda 1$ to $\lambda 4$ emitted from the imaging optical system 10 is received by each of the pixels P1 to P16 is bij (i=1 to 4, j=1 to 4). Here, b11 is a ratio of the light beam of the wavelength range $\lambda 1$ received by the first pixel P1, b12 is a ratio of the light beam of the wavelength range $\lambda 2$ received by the first pixel P1, b13 is a ratio of the light beam of the wavelength range $\lambda 3$ received by the first pixel P1, and b14 is a ratio of the light beam of the wavelength range $\lambda 4$ received by the first pixel P1. In addition, b21 is a ratio of the light beam of the wavelength range $\lambda 1$ received by the second pixel P2, b22 is a ratio of the light beam of the wavelength range $\lambda 2$ received by the second pixel P2, b23 is a ratio of the light beam of the wavelength range $\lambda 3$ received by the second pixel P2, and b24 is a ratio of the light beam of the wavelength range $\lambda 4$ received by the second pixel P2. In addition, b31 is a ratio of the light beam of the wavelength range $\lambda 1$ received by the third pixel P3, b32 is a ratio of the light beam of the wavelength range $\lambda 2$ received by the third pixel P3, b33 is a ratio of the light beam of the wavelength range $\lambda 3$ received by the third pixel P3, and b34 is a ratio of the light beam of the wavelength range $\lambda 4$ received by the third pixel P3. In addition, b41 is a ratio of the light beam of the wavelength range $\lambda 1$ received by the fourth pixel P4, b42 is a ratio of the light beam of the wavelength range $\lambda 2$ received by the fourth pixel P4, b43 is a ratio of the light beam of the wavelength range $\lambda 3$ received by the fourth pixel P4, and b44 is a ratio of the light beam of the wavelength range $\lambda 4$ received by the fourth pixel P4. In addition, b51 is a ratio of the light beam of the wavelength range $\lambda 1$ received by the fifth pixel P5, b52 is a ratio of the light beam of the wavelength range $\lambda 2$ $$A = \begin{bmatrix} a11 & a12 & a13 & a14 & a15 & a16 & a17 & a18 & a19 & a110 & a111 & a112 & a113 & a114 & a115 & a116 \\ a21 & a22 & a23 & a24 & a25 & a26 & a27 & a28 & a29 & a210 & a211 & a212 & a213 & a214 & a215 & a216 \\ a31 & a32 & a33 & a34 & a35 & a36 & a37 & a38 & a39 & a310 & a311 & a312 & a313 & a314 & a315 & a316 \\ a41 & a42 & a43 & a44 & a45 & a46 & a47 & a48 & a49 & a410 & a411 & a412 & a413 & a414 & a415 & a416 \end{bmatrix} \quad \text{Equation 1}$$

$$\begin{bmatrix} \beta 1 \\ \beta 2 \\ \beta 3 \\ \beta 4 \end{bmatrix} = \begin{bmatrix} a11 & a12 & a13 & a14 & a15 & a16 & a17 & a18 & a19 & a110 & a111 & a112 & a113 & a114 & a115 & a116 \\ a21 & a22 & a23 & a24 & a25 & a26 & a27 & a28 & a29 & a210 & a211 & a212 & a213 & a214 & a215 & a216 \\ a31 & a32 & a33 & a34 & a35 & a36 & a37 & a38 & a39 & a310 & a311 & a312 & a313 & a314 & a315 & a316 \\ a41 & a42 & a43 & a44 & a45 & a46 & a47 & a48 & a49 & a410 & a411 & a412 & a413 & a414 & a415 & a416 \end{bmatrix} * \begin{bmatrix} \alpha 1 \\ \alpha 2 \\ \alpha 3 \\ \alpha 4 \\ \alpha 5 \\ \alpha 6 \\ \alpha 7 \\ \alpha 8 \\ \alpha 9 \\ \alpha 10 \\ \alpha 11 \\ \alpha 12 \\ \alpha 13 \\ \alpha 14 \\ \alpha 15 \\ \alpha 16 \end{bmatrix}$$

received by the fifth pixel P5, b53 is a ratio of the light beam of the wavelength range λ3 received by the fifth pixel P5, and b54 is a ratio of the light beam of the wavelength range λ4 received by the fifth pixel P5. In addition, b61 is a ratio of the light beam of the wavelength range λ1 received by the sixth pixel P6, b62 is a ratio of the light beam of the wavelength range λ2 received by the sixth pixel P6, b63 is a ratio of the light beam of the wavelength range λ3 received by the sixth pixel P6, and b64 is a ratio of the light beam of the wavelength range λ4 received by the sixth pixel P6. In addition, b71 is a ratio of the light beam of the wavelength range λ1 received by the seventh pixel P7, b72 is a ratio of the light beam of the wavelength range λ2 received by the seventh pixel P7, b73 is a ratio of the light beam of the wavelength range λ3 received by the seventh pixel P7, and b74 is a ratio of the light beam of the wavelength range λ4 received by the seventh pixel P7. In addition, b81 is a ratio of the light beam of the wavelength range λ1 received by the eighth pixel P8, b82 is a ratio of the light beam of the wavelength range λ2 received by the eighth pixel P8, b83 is a ratio of the light beam of the wavelength range λ3 received by the eighth pixel P8, and b84 is a ratio of the light beam of the wavelength range λ4 received by the eighth pixel P8. In addition, b91 is a ratio of the light beam of the wavelength range λ1 received by the ninth pixel P9, b92 is a ratio of the light beam of the wavelength range λ2 received by the ninth pixel P9, b93 is a ratio of the light beam of the wavelength range λ3 received by the ninth pixel P9, and b94 is a ratio of the light beam of the wavelength range λ4 received by the ninth pixel P9. In addition, b101 is a ratio of the light beam of the wavelength range λ1 received by the tenth pixel P10, b102 is a ratio of the light beam of the wavelength range λ2 received by the tenth pixel P10, b103 is a ratio of the light beam of the wavelength range λ3 received by the tenth pixel P10, and b104 is a ratio of the light beam of the wavelength range λ4 received by the tenth pixel P10. In addition, b111 is a ratio of the light beam of the wavelength range λ1 received by the eleventh pixel P11, b112 is a ratio of the light beam of the wavelength range λ2 received by the eleventh pixel P11, b113 is a ratio of the light beam of the wavelength range λ3 received by the eleventh pixel P11, and b114 is a ratio of the light beam of the wavelength range λ4 received by the eleventh pixel P11. In addition, b121 is a ratio of the light beam of the wavelength range λ1 received by the twelfth pixel P12, b122 is a ratio of the light beam of the wavelength range λ2 received by the twelfth pixel P12, b123 is a ratio of the light beam of the wavelength range λ3 received by the twelfth pixel P12, and b124 is a ratio of the light beam of the wavelength range λ4 received by the twelfth pixel P12. In addition, b131 is a ratio of the light beam of the wavelength range λ1 received by the thirteenth pixel P13, b132 is a ratio of the light beam of the wavelength range λ2 received by the thirteenth pixel P13, b133 is a ratio of the light beam of the wavelength range λ3 received by the thirteenth pixel P13, and b134 is a ratio of the light beam of the wavelength range λ4 received by the thirteenth pixel P13. In addition, b141 is a ratio of the light beam of the wavelength range λ1 received by the fourteenth pixel P14, b142 is a ratio of the light beam of the wavelength range λ2 received by the fourteenth pixel P14, b143 is a ratio of the light beam of the wavelength range λ3 received by the fourteenth pixel P14, and b144 is a ratio of the light beam of the wavelength range λ4 received by the fourteenth pixel P14. In addition, b151 is a ratio of the light beam of the wavelength range λ1 received by the fifteenth pixel P15, b152 is a ratio of the light beam of the wavelength range λ2 received by the fifteenth pixel P15, b153 is a ratio of the light beam of the wavelength range λ3 received by the fifteenth pixel P15, and b154 is a ratio of the light beam of the wavelength range λ4 received by the fifteenth pixel P15. In addition, b161 is a ratio of the light beam of the wavelength range λ1 received by the sixteenth pixel P16, b162 is a ratio of the light beam of the wavelength range λ2 received by the sixteenth pixel P16, b163 is a ratio of the light beam of the wavelength range λ3 received by the sixteenth pixel P16, and b164 is a ratio of the light beam of the wavelength range λ4 received by the sixteenth pixel P16. This ratio bij can be obtained in advance by unique determination from setting of the wavelength ranges λ1 to λ4 of the light beams transmitted through the aperture regions 16A1 to 16A4 of the bandpass filter unit 16, setting of the polarization directions θ1 and θ2 of the light beams transmitted through the aperture regions 18A1 to 18A4 of the polarization filter unit 18, and setting of the transmission wavelength characteristics A to D of the pixels P1 to P16 of the imaging element 100, and the polarization directions θA to θC of the light beams received by the pixels P1 to P16 of the imaging element 100.

The following relationship is satisfied between the pixel signals α1 to α16 obtained by the pixels P1 to P16 of each pixel block PB (X, Y) and the pixel signals β1 to β4 corresponding to the light beams of the wavelength ranges λ1 to λ4.

Regarding the pixel signal α1 obtained by the first pixel P1, "b11*β1+b12*β2+b13*β3+b14*β4=α1 . . . Equation 2" is satisfied ("*" is a symbol of integration).

Regarding the pixel signal α2 obtained by the second pixel P2, "b21*β1+b22*β2+b23*β3+b24*β4=α2 . . . Equation 3" is satisfied.

Regarding the pixel signal α3 obtained by the third pixel P3, "b31*β1+b32*β2+b33*β3+b34*β4=α3 . . . Equation 4" is satisfied.

Regarding the pixel signal α4 obtained by the fourth pixel P4, "b41*β1+b42*β2+b43*β3+b44*β4=α4 . . . Equation 5" is satisfied.

Regarding the pixel signal α5 obtained by the fifth pixel P5, "b51*β1+b52*β2+b53*β3+b54*β4=α5 . . . Equation 6" is satisfied.

Regarding the pixel signal α6 obtained by the sixth pixel P6, "b61*β1+b62*β2+b63*β3+b64*β4=α6 . . . Equation 7" is satisfied.

Regarding the pixel signal α7 obtained by the seventh pixel P7, "b71*β1+b72*β2+b73*β3+b74*β4=α7 . . . Equation 8" is satisfied.

Regarding the pixel signal α8 obtained by the eighth pixel P8, "b81*β1+b82*β2+b83*β3+b84*β4=α8 . . . Equation 9" is satisfied.

Regarding the pixel signal α9 obtained by the ninth pixel P9, "b91*β1+b92*β2+b93*β3+b94*β4=α9 . . . Equation 10" is satisfied.

Regarding the pixel signal α10 obtained by the tenth pixel P10, "b101*β1+b102*β2+b103*β3+b104*β4=α10 . . . Equation 11" is satisfied.

Regarding the pixel signal α11 obtained by the eleventh pixel P11, "b111*β1+b112*β2+b113*β3+b114*β4=α11 . . . Equation 12" is satisfied.

Regarding the pixel signal α12 obtained by the twelfth pixel P12, "b121*β1+b122*β2+b123*β3+b124*β4=α12 . . . Equation 13" is satisfied.

Regarding the pixel signal α13 obtained by the thirteenth pixel P13, "b131*β1+b132*β2+b133*β3+b134*β4=α13 . . . Equation 14" is satisfied.

Regarding the pixel signal α14 obtained by the fourteenth pixel P14, "b141*β1+b142*β2+b143*β3+b144*β4=α14 . . . Equation 15" is satisfied.

Regarding the pixel signal $\alpha 15$ obtained by the fifteenth pixel P15, "$b151*\beta 1+b152*\beta 2+b153*\beta 3+b154*\beta 4=\alpha 15$ . . . Equation 16" is satisfied.

Regarding the pixel signal $\alpha 16$ obtained by the sixteenth pixel P16, "$b161*\beta 1+b162*\beta 2+b163*\beta 3+b164*\beta 4=\alpha 16$ . . . Equation 17" is satisfied.

Here, the simultaneous equations of Equations 2 to 17 can be expressed by Equation 18 using a matrix B.

$$B = \begin{bmatrix} b11 & b12 & b13 & b14 \\ b21 & b22 & b23 & b24 \\ b31 & b32 & b33 & b34 \\ b41 & b42 & b43 & b44 \\ b51 & b52 & b53 & b54 \\ b61 & b62 & b63 & b64 \\ b71 & b72 & b73 & b74 \\ b81 & b82 & b83 & b84 \\ b91 & b92 & b93 & b94 \\ b101 & b102 & b103 & b104 \\ b111 & b112 & b113 & b114 \\ b121 & b122 & b123 & b124 \\ b131 & b132 & b133 & b134 \\ b141 & b142 & b143 & b144 \\ b151 & b152 & b153 & b154 \\ b161 & b162 & b163 & b164 \end{bmatrix} \quad \text{Equation 18}$$

$$\begin{bmatrix} b11 & b12 & b13 & b14 \\ b21 & b22 & b23 & b24 \\ b31 & b32 & b33 & b34 \\ b41 & b42 & b43 & b44 \\ b51 & b52 & b53 & b54 \\ b61 & b62 & b63 & b64 \\ b71 & b72 & b73 & b74 \\ b81 & b82 & b83 & b84 \\ b91 & b92 & b93 & b94 \\ b101 & b102 & b103 & b104 \\ b111 & b112 & b113 & b114 \\ b121 & b122 & b123 & b124 \\ b131 & b132 & b133 & b134 \\ b141 & b142 & b143 & b144 \\ b151 & b152 & b153 & b154 \\ b161 & b162 & b163 & b164 \end{bmatrix} * \begin{bmatrix} \beta 1 \\ \beta 2 \\ \beta 3 \\ \beta 4 \end{bmatrix} = \begin{bmatrix} \alpha 1 \\ \alpha 2 \\ \alpha 3 \\ \alpha 4 \\ \alpha 5 \\ \alpha 6 \\ \alpha 7 \\ \alpha 8 \\ \alpha 9 \\ \alpha 10 \\ \alpha 11 \\ \alpha 12 \\ \alpha 13 \\ \alpha 14 \\ \alpha 15 \\ \alpha 16 \end{bmatrix}$$

$\beta 1$ to $\beta 4$, which are the solutions of the simultaneous equations of Equations 2 to 17, are calculated by multiplying both sides of Equation 18 by an inverse matrix $B^{-1}$ of the matrix B.

$$\begin{bmatrix} \beta 1 \\ \beta 2 \\ \beta 3 \\ \beta 4 \end{bmatrix} = \begin{bmatrix} b11 & b12 & b13 & b14 \\ b21 & b22 & b23 & b24 \\ b31 & b32 & b33 & b34 \\ b41 & b42 & b43 & b44 \\ b51 & b52 & b53 & b54 \\ b61 & b62 & b63 & b64 \\ b71 & b72 & b73 & b74 \\ b81 & b82 & b83 & b84 \\ b91 & b92 & b93 & b94 \\ b101 & b102 & b103 & b104 \\ b111 & b112 & b113 & b114 \\ b121 & b122 & b123 & b124 \\ b131 & b132 & b133 & b134 \\ b141 & b142 & b143 & b144 \\ b151 & b152 & b153 & b154 \\ b161 & b162 & b163 & b164 \end{bmatrix}^{-1} * \begin{bmatrix} \alpha 1 \\ \alpha 2 \\ \alpha 3 \\ \alpha 4 \\ \alpha 5 \\ \alpha 6 \\ \alpha 7 \\ \alpha 8 \\ \alpha 9 \\ \alpha 10 \\ \alpha 11 \\ \alpha 12 \\ \alpha 13 \\ \alpha 14 \\ \alpha 15 \\ \alpha 16 \end{bmatrix} \quad \text{Equation 19}$$

In this way, the pixel signals $\beta 1$ to $\beta 4$ corresponding to the wavelength ranges $\lambda 1$ to $\lambda 4$ can be calculated from the signal values (pixel signals) $\alpha 1$ to $\alpha 16$ of the pixels P1 to P16 based on the ratio in which the light beam of the wavelength ranges $\lambda 1$ to $\lambda 4$ emitted from the imaging optical system 10 received by the pixels P1 to P16 of the pixel block PB (X, Y).

In Equation 1, the inverse matrix $B^{-1}$ of Equation 19 is set to A ($B^{-1}$=A). Therefore, elements aij of the matrix A in Equation 1 can be acquired by obtaining the inverse matrix $B^{-1}$ of the matrix B.

The coefficient storage unit 200C stores the elements aij of the matrix A for performing the interference removal processing, as a coefficient group.

The image generation unit 200B acquires the coefficient group from the coefficient storage unit 200C, calculates the pixel signals $\beta 1$ to $\beta 4$ corresponding to the wavelength ranges $\lambda 1$ to $\lambda 4$ by Equation 1 from the pixel signals $\alpha 1$ to $\alpha 16$ obtained from the pixels P1 to P16 of each pixel block PB (X, Y), and generates the image data of the wavelength ranges $\lambda 1$ to $\lambda 4$.

The image data of the wavelength ranges $\lambda 1$ to $\lambda 4$ generated by the image generation unit 200B are output to the outside and stored in a storage device (not shown), if necessary. In addition, the image signals thereof are displayed on a display (not shown), if necessary.

[Image Generation]

Figure 13:
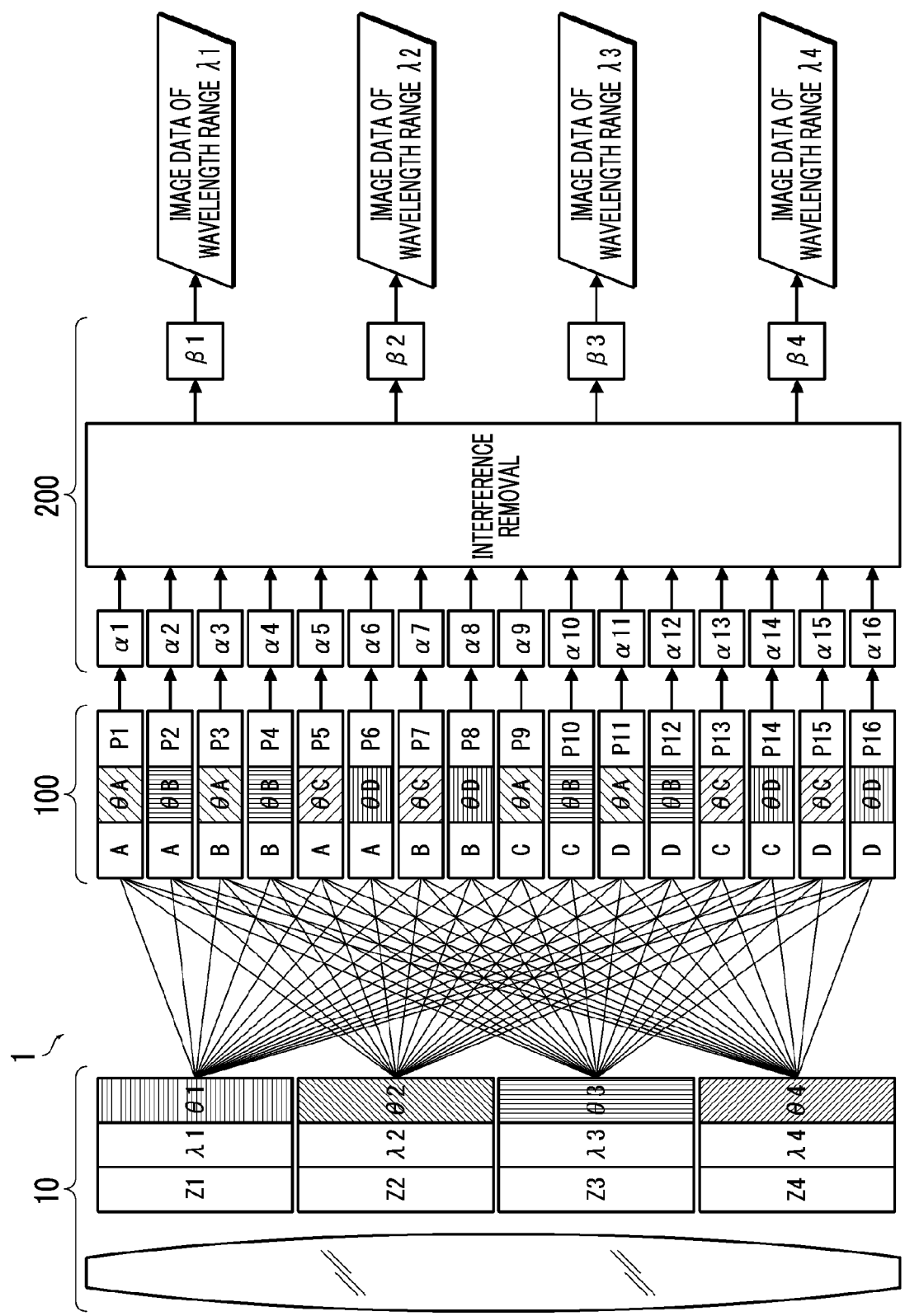
FIG. 13 is a conceptual diagram of the image generation by an imaging apparatus.

FIG. 13 is a conceptual diagram of the image generation by the imaging apparatus.

The light beams incident on the imaging optical system 10 become four types of the light beams having different characteristics, which are incident on the imaging element 100. Specifically, the light beams become the light beam (first light beam) of the polarization direction $\theta 1$ and the wavelength range $\lambda 1$, the light beam (second light beam) of the polarization direction $\theta 1$ and the wavelength range $\lambda 2$, the light beam (third light beam) of the polarization direction $\theta 2$ and the wavelength range $\lambda 3$, and the light beam (fourth light beam) of the polarization direction $\theta 2$ and the wavelength range $\lambda 4$, which are incident on the imaging element 100.

In each pixel block PB (X, Y) of the imaging element 100, the light beam of each of the wavelength ranges emitted from the imaging optical system 10 is received in each of the pixels P1 to P16 at the predetermined ratio bij. That is, the light beam of each of the wavelength ranges $\lambda 1$ to $\lambda 4$ is received at the predetermined ratio bij by the actions of the polarization filter elements 122A to 122D and the spectral filter elements 132A to 132D provided in each of the pixels P1 to P16.

The signal processing unit 200 calculates the pixel signals $\beta 1$ to $\beta 4$ corresponding to the light beams of the wavelength ranges $\lambda 1$ to $\lambda 4$ from the pixel signals $\alpha 1$ to $\alpha 16$ obtained from the pixels P1 to P16 of each pixel block PB (X, Y) of the imaging element 100, and generates the image data of the wavelength ranges $\lambda 1$ to $\lambda 4$. That is, the signal processing unit 200 performs arithmetic processing (interference removal processing) by Equation 1 using the matrix A, calculates the pixel signals $\beta 1$ to $\beta 4$ corresponding to the light beam of the wavelength ranges $\lambda 1$ to $\lambda 4$ from the pixel signals $\alpha 1$ to $\alpha 16$ of the pixels P1 to P16 obtained from the imaging element 100, and generates the image data of the wavelength ranges $\lambda 1$ to $\lambda 4$.

In this way, with the imaging apparatus according to the present embodiment, the image of four types of different wavelength ranges (multispectral image of four bands) can be captured by using one imaging optical system 10 and one (single plate) imaging element 100.

[Aberration Correction of Imaging Optical System]

As described above, the imaging apparatus 1 according to the present embodiment captures the multispectral image by splitting the pupil region of the imaging optical system 10 into a plurality of regions (pupil splitting) and limiting the wavelength range in each region.

By the way, in a general imaging optical system, the aberration differs depending on the wavelength. Therefore, even in a case in which the pupil splitting is simply performed in the general imaging optical system to be used for imaging, the multispectral image having a good image quality cannot be obtained. Note that the "general imaging optical system" here means an imaging optical system in which the aberration for each wavelength is not particularly corrected, that is, an imaging optical system in which the aberration for each wavelength remains.

As described above, in the imaging apparatus 1 according to the present embodiment, the bandpass filters 16B1 to 16B4 have the functions of individually correcting the aberrations of the regions corresponding to the pupil regions Z1 to Z4. Specifically, the bandpass filters 16B1 to 16B4 have a lens shape having a curvature on at least one surface on an object side or an image side, and the curvatures are individually adjusted to individually correct the aberrations of the corresponding regions. That is, by providing a lens function in the bandpass filter, an optical path length of the region corresponding to each of the pupil regions Z1 to Z4 is individually adjusted to correct the aberration.

Figure 14:
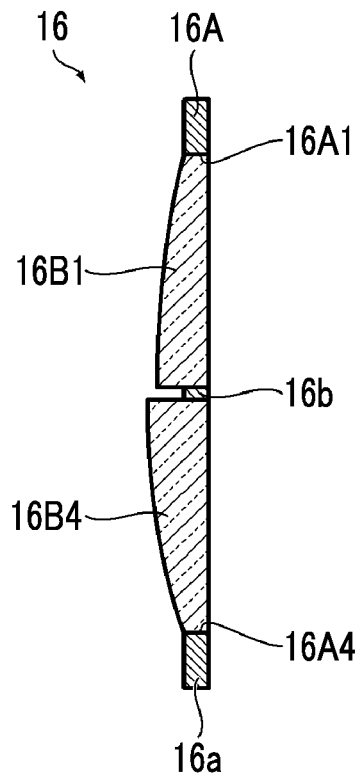
FIG. 14 is a cross-sectional view taken along a line 14-14 of the bandpass filter unit shown in FIG. 2.
Figure 15:
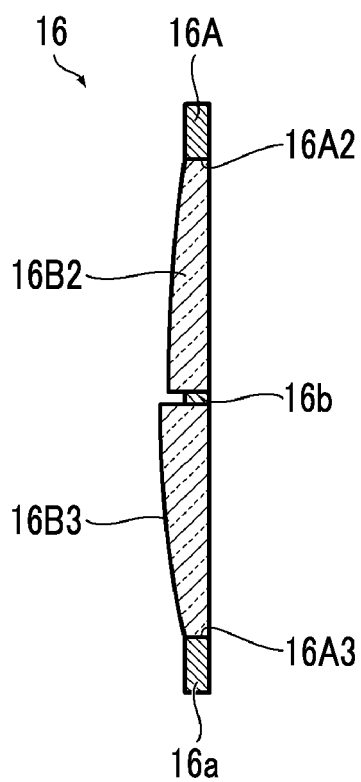
FIG. 15 is a cross-sectional view taken along a line 15-15 of the bandpass filter unit shown in FIG. 3.

FIG. 14 is a cross-sectional view taken along a line 14-14 of the bandpass filter unit shown in FIG. 2. FIG. 14 shows cross sections of the first bandpass filter 16B1 and the fourth bandpass filter 16B4. In addition, FIG. 15 is a cross-sectional view taken along a line 15-15 of the bandpass filter unit shown in FIG. 2. FIG. 15 shows cross sections of the second bandpass filter 16B2 and the third bandpass filter 16B3.

As shown in FIGS. 14 and 15, the bandpass filters 16B1 to 16B4 each have one surface (surface on the object side (left side in FIGS. 14 and 15)) formed of a curved surface. In the imaging optical system 10, the curvatures of one surface of each of the bandpass filters 16B1 to 16B4 are individually adjusted to correct the aberrations of the regions corresponding to the pupil regions Z1 to Z4. Specifically, the curvature of one surface of the first bandpass filter 16B1 is adjusted to correct the aberration of the region corresponding to the first pupil region Z1. In addition, the curvature of one surface of the second bandpass filter 16B2 is adjusted to correct the aberration of the region corresponding to the second pupil region Z2. In addition, the curvature of one surface of the third bandpass filter 16B3 is adjusted to correct the aberration of the region corresponding to the third pupil region Z3. In addition, the curvature of the surface on the object side of the fourth bandpass filter 16B4 is adjusted to correct the aberration of the region corresponding to the fourth pupil region Z4.

A focal length of each of the bandpass filters 16B1 to 16B4 is changed by changing the curvature of one surface. The focal lengths at central wavelengths of the light beams which pass through the pupil regions Z1 to Z4 of the imaging optical system 10 are f1, f2, f3, and f4. The focal lengths of the bandpass filters 16B1 to 16B4 are shortened in descending order of the focal lengths f1, f2, f3, and f4.

In this way, in the imaging optical system 10, the aberrations of the regions corresponding to the pupil regions Z1 to Z4 are individually corrected by the bandpass filters 16B1 to 16B4. As a result, in the imaging optical system 10, the aberration characteristics of the regions corresponding to the pupil regions Z1 to Z4 are different from each other.

With the imaging apparatus 1 according to the present embodiment, the aberration of the region corresponding to each of the pupil regions Z1 to Z4 can be individually controlled, so that the aberration can be controlled for each wavelength. As a result, it is possible to capture the multispectral image having a good image quality.

A method according to the present embodiment can also be applied to an existing imaging lens (general imaging lens not for multispectral imaging). That is, since in the method according to the present embodiment, only the bandpass filter in each pupil-splitting region is disposed and the curvature of each bandpass filter is adjusted, it can be applied to the existing imaging lens. Therefore, by using the method according to the present embodiment, the existing imaging lens can be used as the imaging lens for multispectral imaging.

Note that in the present embodiment, each of the bandpass filters 16B1 to 16B4 has the curvature on only one surface, but may have the curvatures on both surfaces thereof.

Second Embodiment

Also in the imaging apparatus according to the present embodiment, the imaging optical system has a configuration in which the wavelengths of the light beams which pass through the pupil regions are different from each other and the aberration characteristics of the regions corresponding to the pupil regions are different from each other. Specifically, the bandpass filters 16B1 to 16B4 provided in the regions corresponding to the pupil regions Z1 to Z4 limit the wavelength ranges of the light beams which pass through the regions corresponding to the pupil regions Z1 to Z4. In addition, the aberrations in the regions corresponding to the pupil regions Z1 to Z4 are individually corrected by the bandpass filters 16B1 to 16B4 provided in the regions corresponding to the pupil regions Z1 to Z4, and the aberration characteristics of the regions corresponding to the pupil regions Z1 to Z4 are different from each other. The imaging apparatus is the same as the imaging apparatus 1 according to the first embodiment except that a correction method of the aberration is different. Therefore, here, the correction method of the aberration by the bandpass filters 16B1 to 16B4 will be described.

Figure 16:
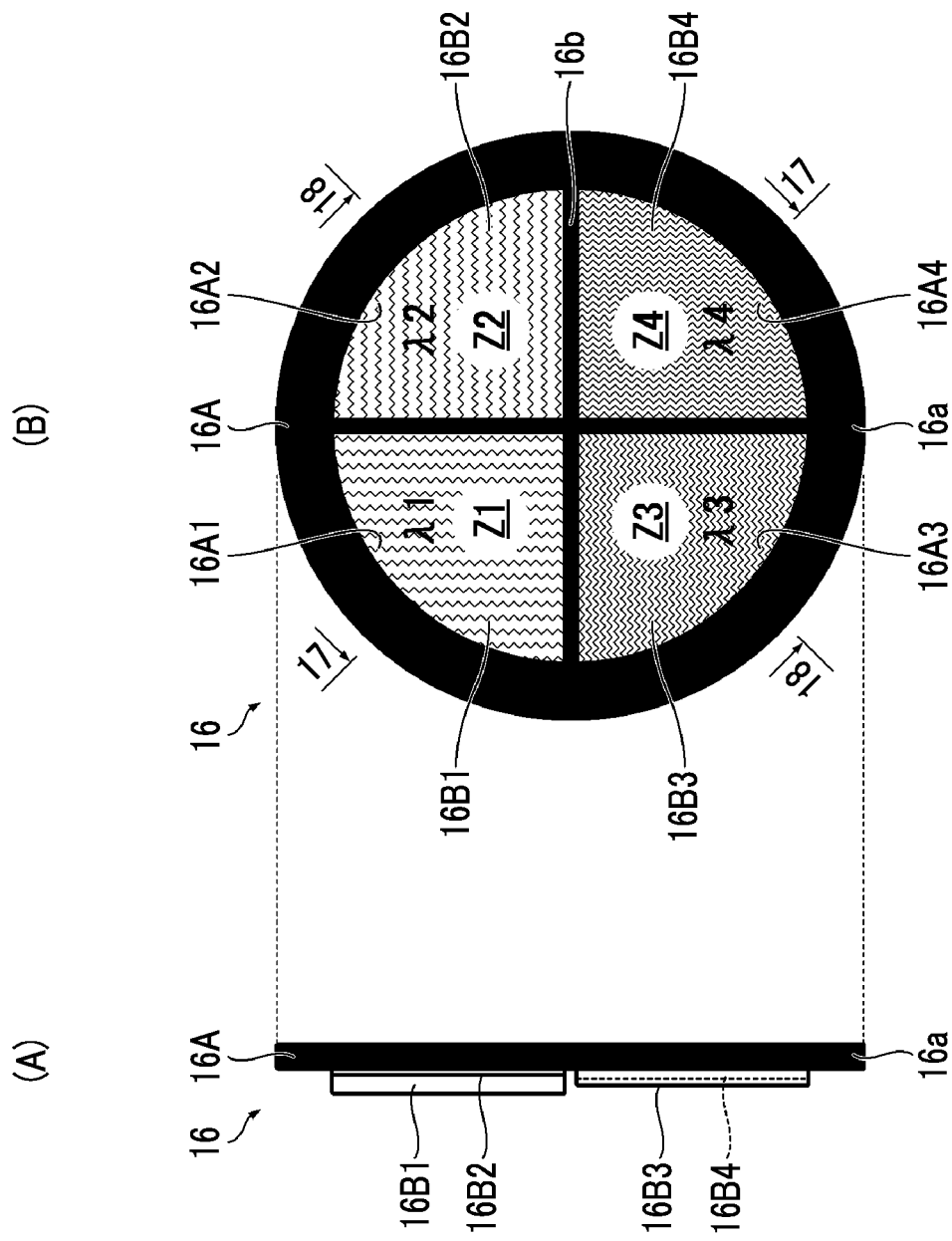
FIG. 16 is a diagram showing a configuration of the bandpass filter unit according to a second embodiment.
Figure 17:
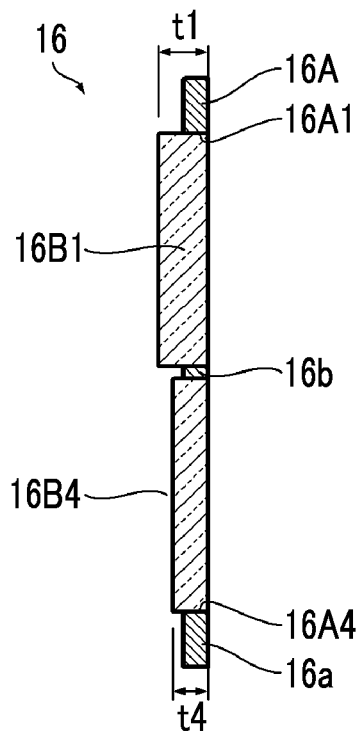
FIG. 17 is a cross-sectional view taken along a line 17-17 of FIG. 16.
Figure 18:
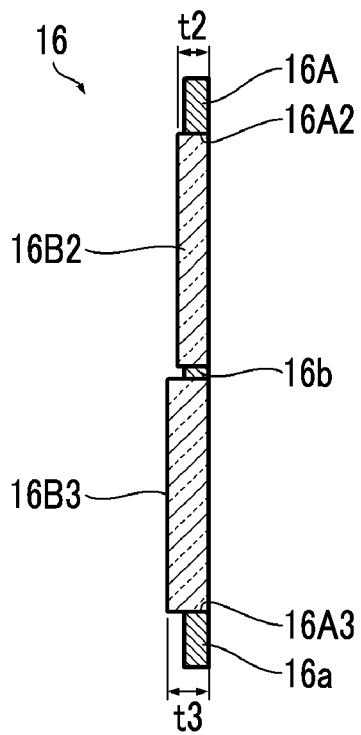
FIG. 18 is a cross-sectional view taken along a line 18-18 of FIG. 16.

FIG. 16 is a diagram showing a configuration of the bandpass filter unit according to the present embodiment. Note that in FIG. 16, (A) shows a side view of the bandpass filter unit, and (B) shows a front view of the bandpass filter unit. FIG. 17 is a cross-sectional view taken along a line 17-17 of FIG. 16. FIG. 17 shows the cross sections of the first bandpass filter 16B1 and the fourth bandpass filter 16B4. In addition, FIG. 18 is a cross-sectional view taken along a line 18-18 of FIG. 16. FIG. 18 shows the cross sections of the second bandpass filter 16B2 and the third bandpass filter 16B3.

As shown in FIGS. 16 to 18, the bandpass filters 16B1 to 16B4 according to the present embodiment have a flat plate shape. In the imaging optical system 10, thicknesses (thicknesses in a direction parallel to the optical axis L) t1 to t4 of the bandpass filters 16B1 to 16B4 are individually adjusted to individually correct the aberrations of the regions corresponding to the pupil regions Z1 to Z4. That is, due to a difference in the thicknesses t1 to t4, even in a case in which an object distance is the same for the entire imaging optical system 10, the object distance for a rear group is changed, and a position of a final image plane can be changed for each wavelength range. Therefore, an axial chromatic aberration (deviation of an imaging position for each color) of the imaging optical system 10 can be individually corrected for each wavelength range by changing the thicknesses t1 to t4 of the bandpass filters 16B1 to 16B4. For example, in a case in which the focal lengths at the central wavelengths of the light beams, which passes through the pupil regions Z1 to Z4 of the imaging optical system 10, are f1, f2, f3, and f4, the thicknesses t1 to t4 of the bandpass filters 16B1 to 16B4 is increased in ascending order of the focal lengths f1, f2, f3, and f4.

In this way, with the imaging apparatus according to the present embodiment, the aberration of the region corresponding to each of the pupil regions Z1 to Z4 can be individually controlled, so that the aberration can be controlled for each wavelength. As a result, it is possible to capture the multispectral image having a good image quality. In addition, since the method according to the present embodiment can also be applied to the existing imaging lens, the existing imaging lens can be used as the imaging lens for multispectral imaging.

Third Embodiment

Also in the imaging apparatus according to the present embodiment, the imaging optical system has a configuration in which the wavelengths of the light beams which pass through the pupil regions are different from each other and the aberration characteristics of the regions corresponding to the pupil regions are different from each other. Specifically, the bandpass filters 16B1 to 16B4 provided in the regions corresponding to the pupil regions Z1 to Z4 limit the wavelength ranges of the light beams which pass through the regions corresponding to the pupil regions Z1 to Z4. In addition, the aberrations in the regions corresponding to the pupil regions Z1 to Z4 are individually corrected by the bandpass filters 16B1 to 16B4 provided in the regions corresponding to the pupil regions Z1 to Z4, and the aberration characteristics of the regions corresponding to the pupil regions Z1 to Z4 are different from each other. The imaging apparatus is the same as the imaging apparatus 1 according to the first embodiment except that a correction method of the aberration is different. Therefore, here, the correction method of the aberration by the bandpass filters 16B1 to 16B4 will be described.

Figure 19:
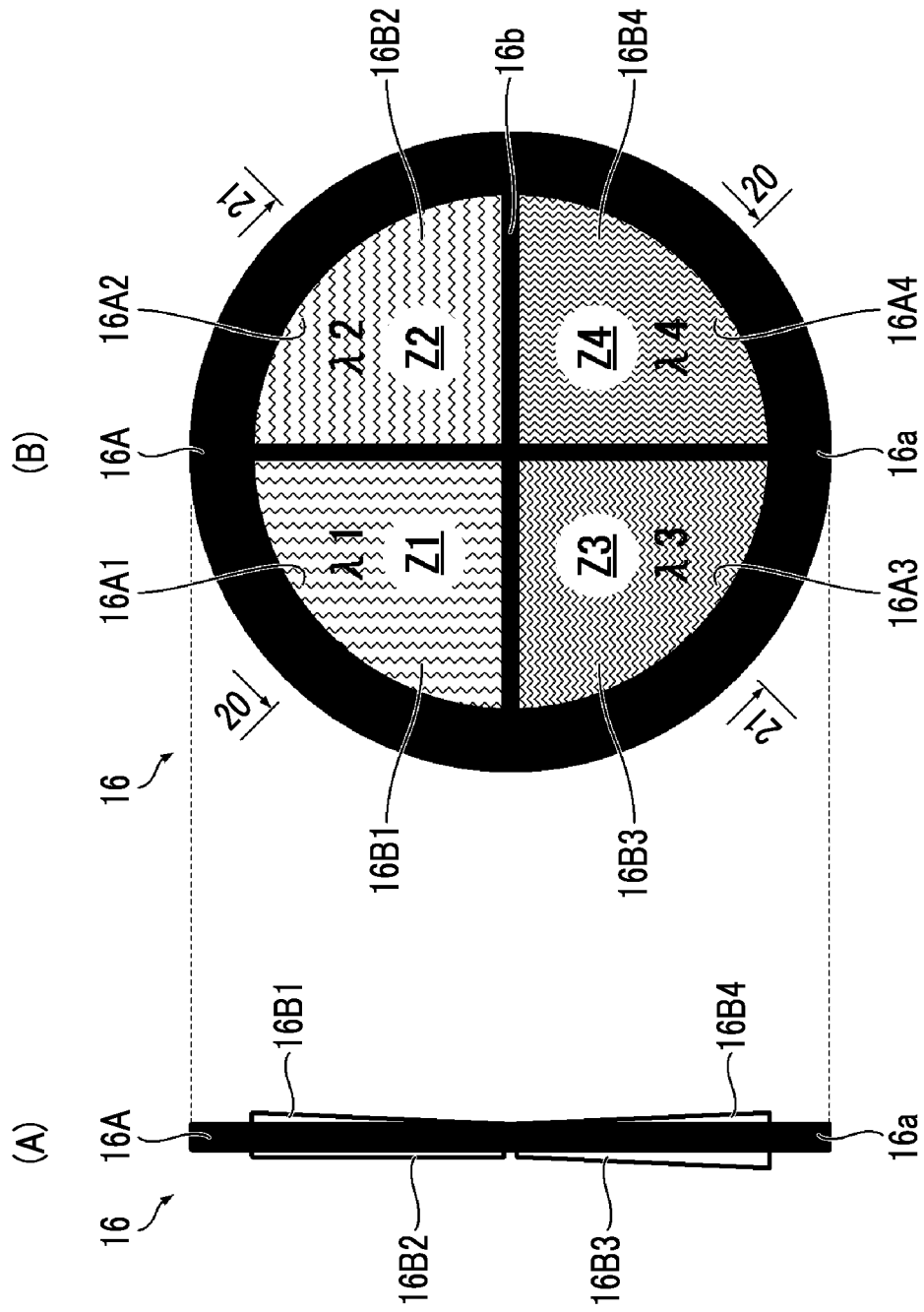
FIG. 19 is a diagram showing a configuration of the bandpass filter unit according to a third embodiment.
Figure 20:
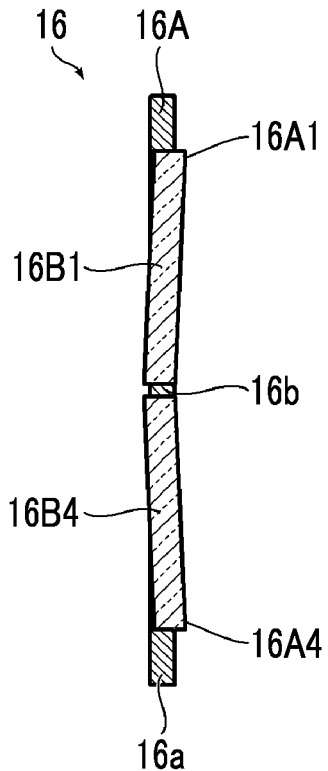
FIG. 20 is a cross-sectional view taken along a line 20-20 of FIG. 19.
Figure 21:
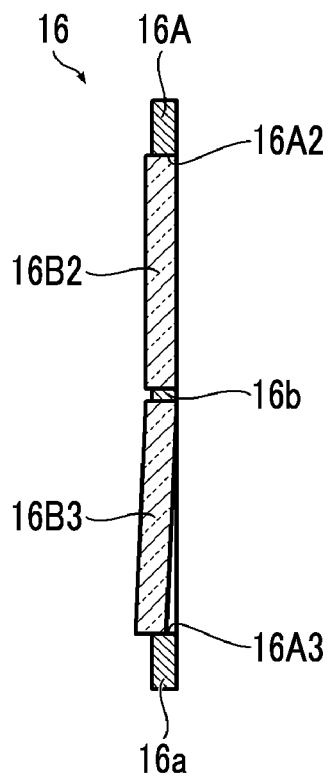
FIG. 21 is a cross-sectional view taken along a line 21-21 of FIG. 19.

FIG. 19 is a diagram showing a configuration of the bandpass filter unit according to the present embodiment. Note that in FIG. 19, (A) shows a side view of the bandpass filter unit, and (B) shows a front view of the bandpass filter unit. FIG. 20 is a cross-sectional view taken along a line 20-20 of FIG. 19. FIG. 20 shows the cross sections of the first bandpass filter 16B1 and the fourth bandpass filter 16B4. In addition, FIG. 21 is a cross-sectional view taken along a line 21-21 of FIG. 19. FIG. 21 shows the cross sections of the second bandpass filter 16B2 and the third bandpass filter 16B3.

As shown in FIGS. 19 to 21, the bandpass filters 16B1 to 16B4 according to the present embodiment have a flat plate shape. In the imaging optical system 10, inclinations of the bandpass filters 16B1 to 16B4 are individually adjusted to individually correct the aberrations in the regions corresponding to the pupil regions Z1 to Z4.

Figure 22:
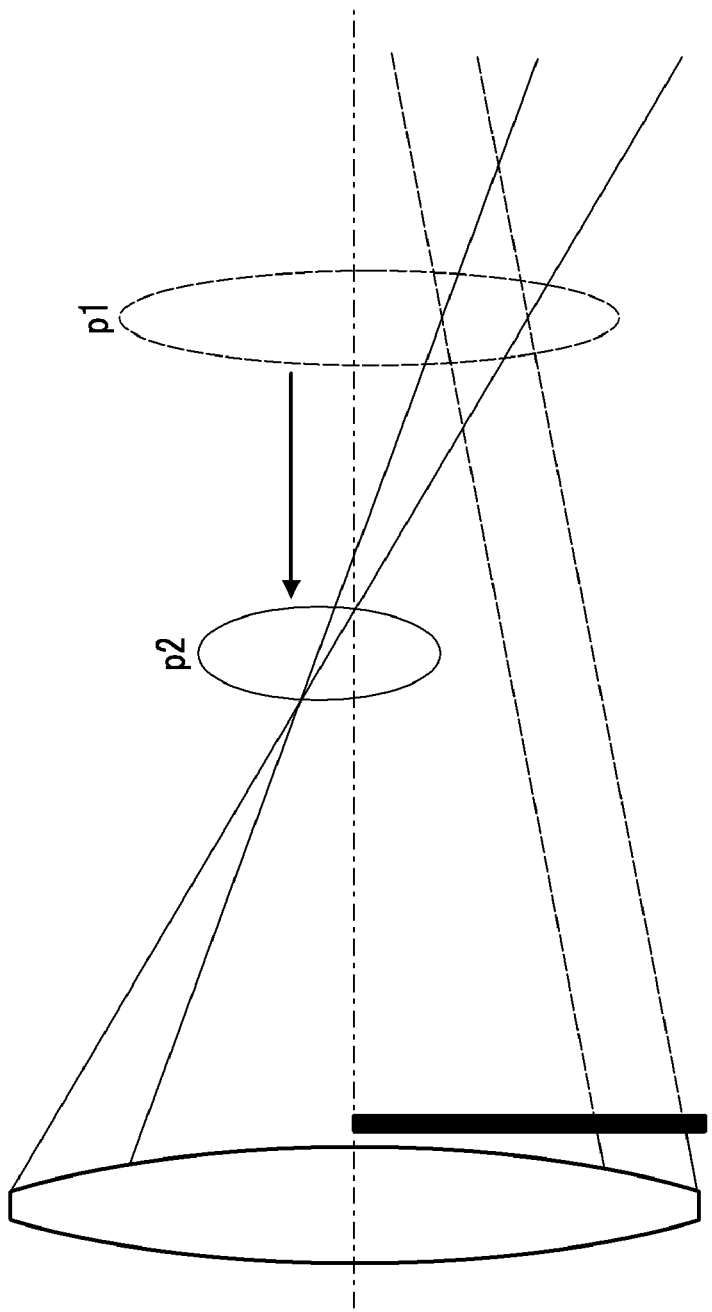
FIG. 22 is a diagram schematically showing an aspect in which an imaging position is shifted due to asymmetric pupil splitting in a lens in which coma aberration remains.

FIG. 22 is a diagram schematically showing an aspect in which the imaging position is shifted due to asymmetric pupil splitting in the lens in which coma aberration remains. In FIG. 22, a position p1 indicates an imaging position in a case in which the pupil does not split, and a position p2 indicates an imaging position in a case in which the pupil is split. As shown in FIG. 22, a central imaging position can be shifted by splitting the pupil in a state in which the coma aberration is generated at a central imaging point.

By individually adjusting the inclinations of the bandpass filters 16B1 to 16B4 provided in the regions corresponding to the pupil regions Z1 to Z4, the axial chromatic aberration can be suppressed for each wavelength range passing through the pupil regions Z1 to Z4. That is, since the imaging position can be changed for each wavelength range, the axial chromatic aberration originally provided in the imaging optical system 10 can be canceled for each wavelength range.

Figure 23:
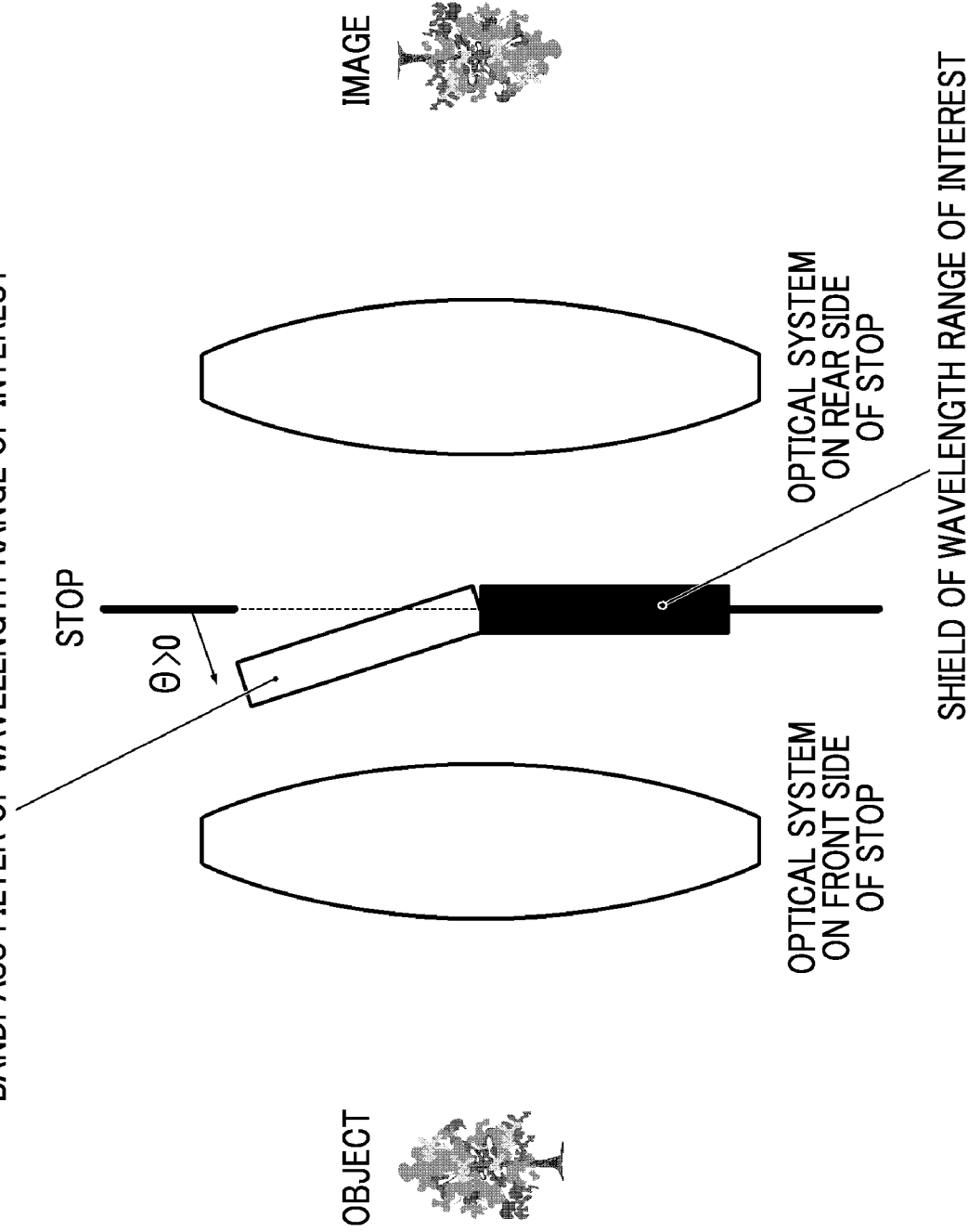
FIG. 23 is a conceptual diagram of inclination setting.

FIG. 23 is a conceptual diagram of inclination setting.

The focal length at a d line (emission line spectrum of 587.6 nm (yellow)) of the optical system on a front side of the stop is f0, and the focal lengths at the central wavelengths of the wavelength ranges of the light beams which pass through the regions corresponding to the pupil regions Z1 to Z4 are f1, f2, f3, and f4, respectively. An angle with a rotation center of a vector orthogonal to a vector drawn from the center to the centroid of the aperture in the stop plane is θ. The angle θ is positive in a direction of inclining toward the object side. In a case in which the focal length f0 on the d line of the optical system on the front side of the stop is f>0, the angle θ is increased in ascending order of the focal lengths f1, f2, f3, and f4. On the other hand, in a case in which the focal length f0 on the d line of the optical system on the front side of the stop is f<0, the angle θ is increased in descending order of the focal lengths f1, f2, f3, and f4.

Figure 24:
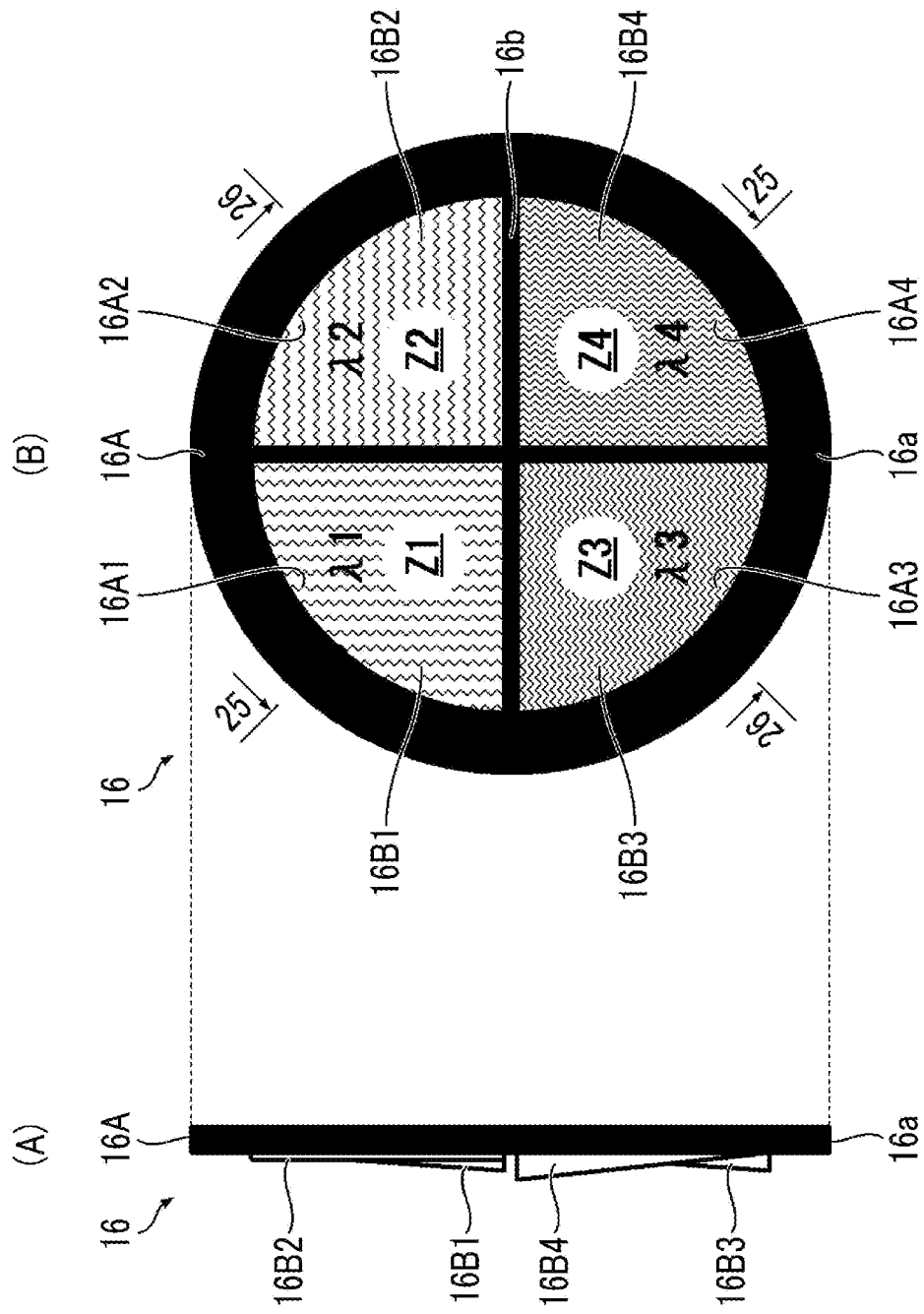
FIG. 24 is a diagram showing another example of the bandpass filter unit according to the third embodiment.
Figure 25:
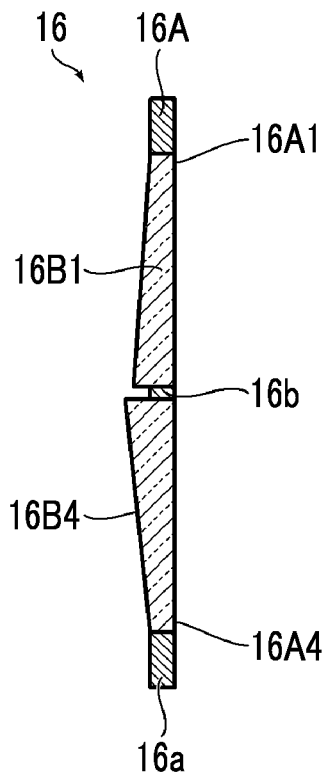
FIG. 25 is a cross-sectional view taken along a line 25-25 of FIG. 24.
Figure 26:
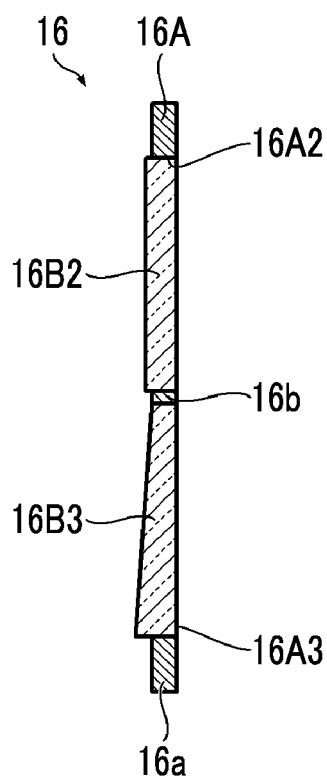
FIG. 26 is a cross-sectional view taken along a line 26-26 of FIG. 24.

FIG. 24 is a diagram showing another example of the bandpass filter unit according to the present embodiment. Note that in FIG. 24, (A) shows a side view of the bandpass filter unit, and (B) shows a front view of the bandpass filter unit. FIG. 25 is a cross-sectional view taken along a line 25-25 of FIG. 24. FIG. 25 shows the cross sections of the first bandpass filter 16B1 and the fourth bandpass filter 16B4. In addition, FIG. 26 is a cross-sectional view taken along a line 26-26 of FIG. 24. FIG. 26 shows the cross sections of the second bandpass filter 16B2 and the third bandpass filter 16B3.

As shown in FIGS. 24 to 26, the bandpass filters 16B1 to 16B4 according to the present embodiment have a flat plate shape having an inclination on one surface (cross section has a wedge shape). In the imaging optical system 10, the inclinations of one surface of each of the bandpass filters 16B1 to 16B4 are individually adjusted to individually correct the aberrations in the regions corresponding to the pupil regions Z1 to Z4.

In this way, the same effect can be obtained by adjusting the inclination of one surface instead of adjusting the inclination of the bandpass filter itself.

Fourth Embodiment

In each of the embodiments described above, the pupil region of the imaging optical system is split equally in the circumferential direction, but the splitting aspect of the pupil region is not limited to this.

Figure 27:
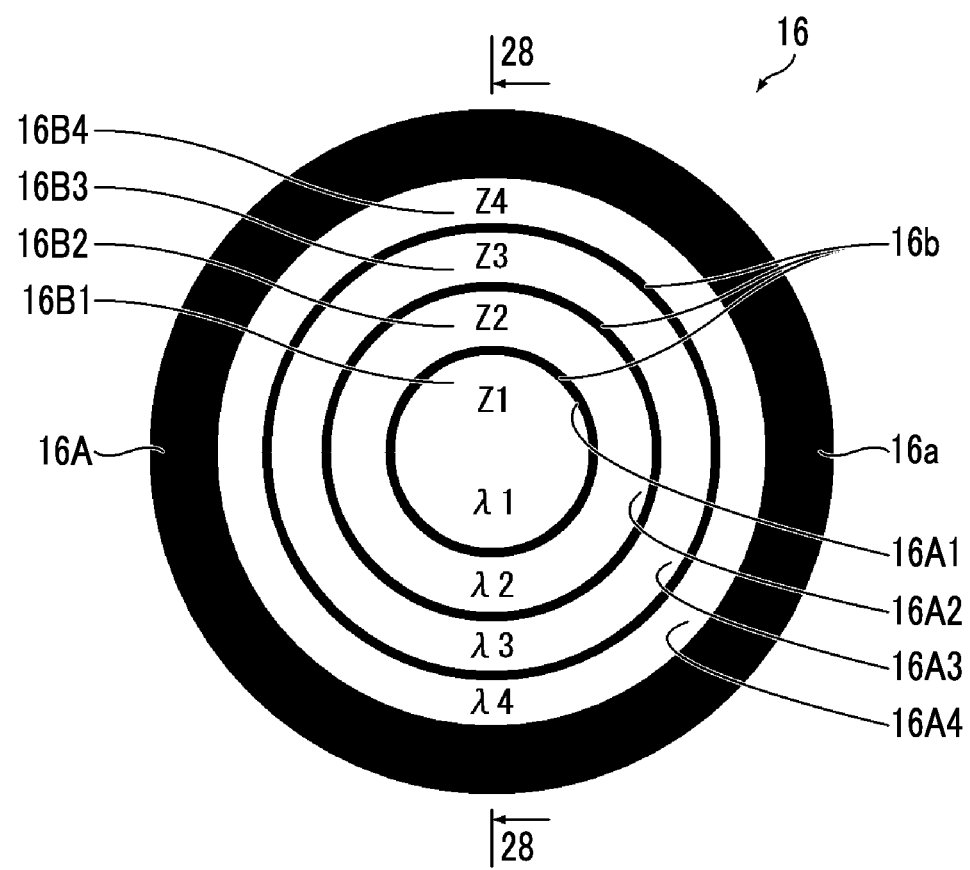
FIG. 27 is a diagram showing another example of a splitting aspect of the pupil region.

FIG. 27 is a diagram showing another example (modification example) of the splitting aspect of the pupil region. FIG. 27 corresponds to a front view of the bandpass filter unit.

As described above, in the imaging optical system, the pupil region is split into a plurality of regions by splitting the inner peripheral portion of the frame body 16a configuring the stop into a plurality of regions. In the present embodiment, as shown in FIG. 27, the inner peripheral portion of the frame body 16a is split concentrically by a plurality of ring-shaped partitions 16b, and the pupil region of the imaging optical system is split into a plurality of regions.

FIG. 27 shows an example of a case in which the pupil region is split into four regions. The four aperture regions (first aperture region 16A1, second aperture region 16A2, third aperture region 16A3, fourth aperture region 16A4) of the frame 16A correspond to four pupil regions (first pupil region Z1, second pupil region Z2, third pupil region Z3, and fourth pupil region Z4), respectively. That is, the first aperture region 16A1 corresponds to the first pupil region Z1. The second aperture region 16A2 corresponds to the second pupil region Z2. The third aperture region 16A3 corresponds to the third pupil region Z3. The fourth aperture region 16A4 corresponds to the fourth pupil region Z4.

A configuration in which the wavelengths of the light beams which pass through the regions corresponding to the pupil regions Z1 to Z4 are different from each other and the aberration characteristics of the regions corresponding to the pupil regions Z1 to Z4 are different from each other is the same as that of the imaging optical system according to the embodiments described above. That is, in the imaging optical system, the wavelength ranges of the light beams which passes through the regions corresponding to the pupil regions Z1 to Z4 are limited by the bandpass filters 16B1 to 16B4 provided in the aperture regions 16A1 to 16A4. In addition, the aberrations of the regions corresponding to the pupil regions Z1 to Z4 are individually corrected by the bandpass filters 16B1 to 16B4.

As the correction method of the aberrations of the regions corresponding to the pupil regions Z1 to Z4, the method described in each of the embodiments described above can be adopted.

Figure 28:
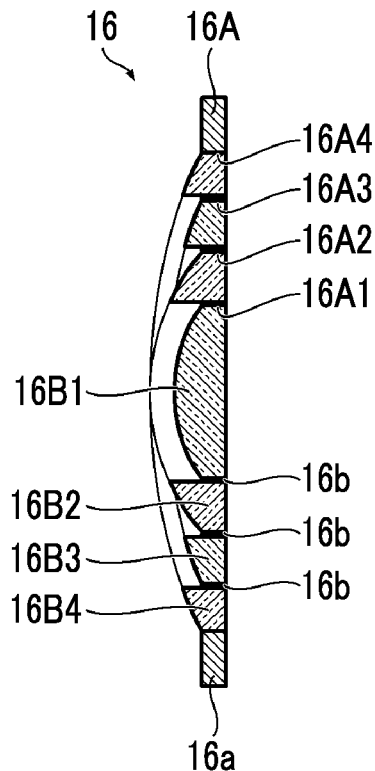
FIG. 28 is a diagram showing an example of a case in which a curvature of the bandpass filter is adjusted to correct an aberration.

FIG. 28 is a diagram showing an example of a case in which the curvature of the bandpass filter is adjusted to correct the aberration. FIG. 28 corresponds to the cross-sectional view taken along a line 28-28 of FIG. 27.

The present embodiment shows an example of a case in which the shape of each of the bandpass filters 16B1 to 16B4 is set as a lens shape, the curvature thereof is individually adjusted, and the aberration of the region corresponding to each of the pupil regions Z1 to Z4 is corrected.

Note that in the example shown in FIG. 28, each of the bandpass filters 16B1 to 16B4 has the curvature on only one surface (surface on the object side), but a configuration of having the curvature on both surfaces thereof can be adopted. In addition, the surface on the image side can be configured to have the curvature.

As in the present embodiment, in a case in which the pupil region is split concentrically, there is an advantage that asymmetry due to the splitting does not occur. On the other hand, since a diffraction limit is decreased toward the outside from the center of lens, it is preferable to set the wavelength range assigned to each of the pupil regions Z1 to Z4 in response to the required image quality (wavelength range that requires high image quality is assigned to the central pupil region).

Figure 29:
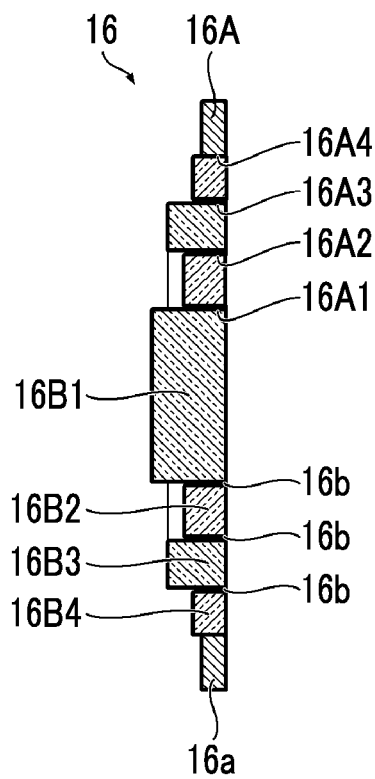
FIG. 29 is a diagram showing another example of a correction method of the aberration.

FIG. 29 is a diagram showing another example of the correction method of the aberration. FIG. 29 shows an example of a case in which the thickness of the bandpass filter is adjusted to correct the aberration.

The present embodiment shows an example of a case in which the shape of each of the bandpass filters 16B1 to 16B4 is set as a flat plate shape, the thickness thereof is individually adjusted, and the aberration of the region corresponding to each of the pupil regions Z1 to Z4 is corrected.

Figure 30:
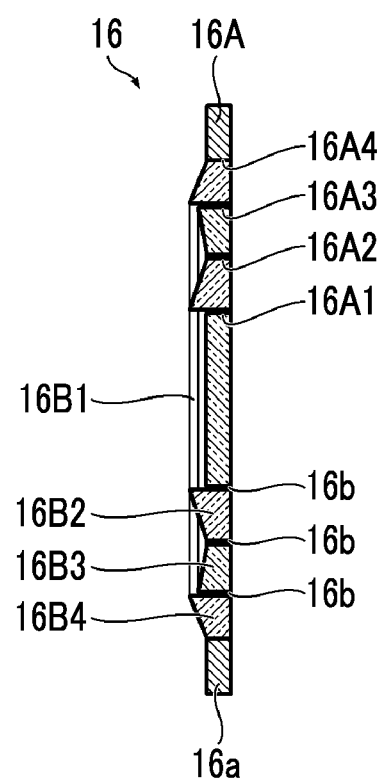
FIG. 30 is a diagram showing still another example of the correction method of the aberration.

FIG. 30 is a diagram showing still another example of the correction method of the aberration. FIG. 30 shows an example of a case in which the inclination of the bandpass filter is adjusted to correct the aberration.

The present embodiment shows an example of a case in which the shape of each of the bandpass filters 16B1 to 16B4 is set as a flat plate shape, the inclination of the one surface thereof is individually adjusted, and the aberration of the region corresponding to each of the pupil regions Z1 to Z4 is corrected.

Note that FIG. 30 shows an example in which the inclination of one surface of each bandpass filter is adjusted, but a configuration can be adopted in which the inclination of the bandpass filter itself is adjusted to correct aberration of the region corresponding to each of the pupil regions Z1 to Z4.

In addition, by combining the methods described above, it is possible to correct the aberration of the region corresponding to each of the pupil regions Z1 to Z4. For example, a configuration can be adopted in which for the first pupil region Z1, the curvature of the first bandpass filter is adjusted to correct the aberration, and for the other pupil regions Z2 to Z4, the thickness of each of the bandpass filters 16B2 to 16B4 is adjusted to correct the aberration.

Fifth Embodiment

In a case in which the multispectral image is captured by splitting the pupil region of the imaging optical system, a good dynamic range cannot be obtained in a case in which a difference in the amount of the light beams for each wavelength range is large. For example, there is a case in which only an image in a specific wavelength range is darkened or overexposed. In the imaging apparatus according to the present embodiment, an aperture area of each pupil region is individually adjusted, and the amount of the light beams for each wavelength range is individually adjusted. The adjustment of the aperture area of each pupil region is realized by adjusting an area (aperture area) of each aperture region of the frame configuring the bandpass filter unit. The imaging apparatus is the same as the imaging apparatus 1 according to the first embodiment, except that the aperture area of each pupil region is adjusted by the bandpass filter unit. Therefore, here, only the configuration of the bandpass filter unit will be described.

Figure 31:
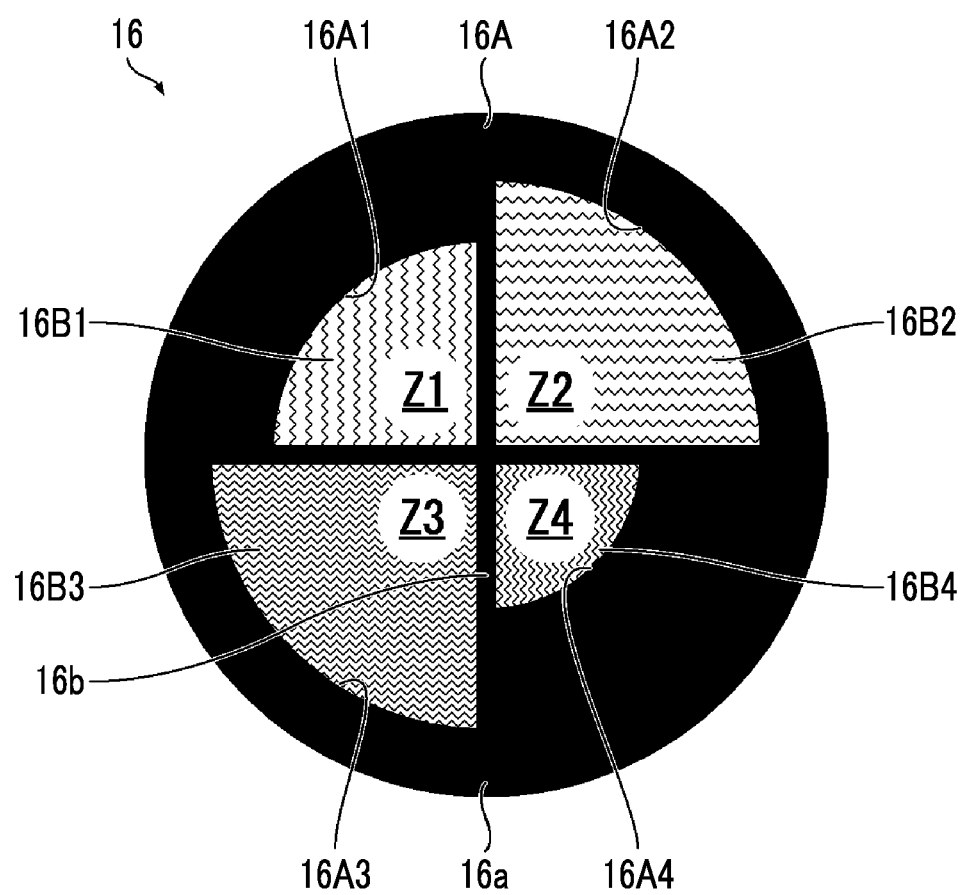
FIG. 31 is a diagram showing a configuration of the bandpass filter unit according to the present embodiment.

FIG. 31 is a diagram showing a configuration of the bandpass filter unit according to the present embodiment.

As shown in FIG. 31, in the bandpass filter unit 16 according to the present embodiment, outer peripheral diameters of the aperture regions 16A1 to 16A4 are individually adjusted to individually adjust the areas (aperture areas) of the aperture regions 16A1 to 16A4. In the imaging optical system, the areas of the aperture regions 16A1 to 16A4 are individually adjusted, so that the aperture areas of the corresponding pupil regions Z1 to Z4 are individually adjusted. In addition, in the imaging optical system, the aperture areas of the pupil regions Z1 to Z4 are individually adjusted, so that the amounts of the light beams which pass through the pupil regions Z1 to Z4 are individually adjusted. As a result, in the imaging optical system, the amounts of the light beams which pass through the pupil regions Z1 to Z4 are different from each other.

In this way, by individually adjusting the amounts of the light beams which pass through the pupil regions Z1 to Z4, the amount of light beam for each wavelength range can be individually adjusted, and a good dynamic range can be obtained.

In addition, by reducing the aperture area of each of the pupil regions Z1 to Z4, it is possible to reduce the aberration of the region corresponding to each of the pupil regions Z1 to Z4. Therefore, by individually adjusting the aperture area of each of the pupil regions Z1 to Z4, the aberration of the region corresponding to each of the pupil regions Z1 to Z4 can be individually corrected. For example, the aperture area is reduced as the distance from the d line is increased. Since a normal imaging lens is designed with reference to a vicinity of the d line, the aberration is increased as the distance from the d line is increased. Therefore, it is preferable to reduce the aperture area by reducing the aberration as the wavelength becomes farther from the d line.

Note that in the present embodiment, the configuration has been adopted in which the outer peripheral diameter of each of the aperture regions 16A1 to 16A4 is changed to adjust the area of each of the aperture regions 16A1 to 16A4, but the adjustment method of the area of each of the aperture regions 16A1 to 16A4 is not limited to this. In addition, for example, the area of each of the aperture regions 16A1 to 16A4 can be adjusted by changing the width of the partition 16b.

Sixth Embodiment

As described above, by individually adjusting the amounts of the light beams which pass through the pupil regions Z1 to Z4, the amount of light beam for each wavelength range can be individually adjusted, and a good dynamic range can be obtained. In the fifth embodiment, the aperture area of each of the pupil regions Z1 to Z4 is individually adjusted to individually adjust the amount of light beam which passes through each of the pupil regions Z1 to Z4. In the present embodiment, transmittances of the bandpass filters 16B1 to 16B4 provided corresponding to the pupil regions Z1 to Z4 are adjusted to adjust the amounts of the light beams which pass through the pupil regions Z1 to Z4.

Figure 32:
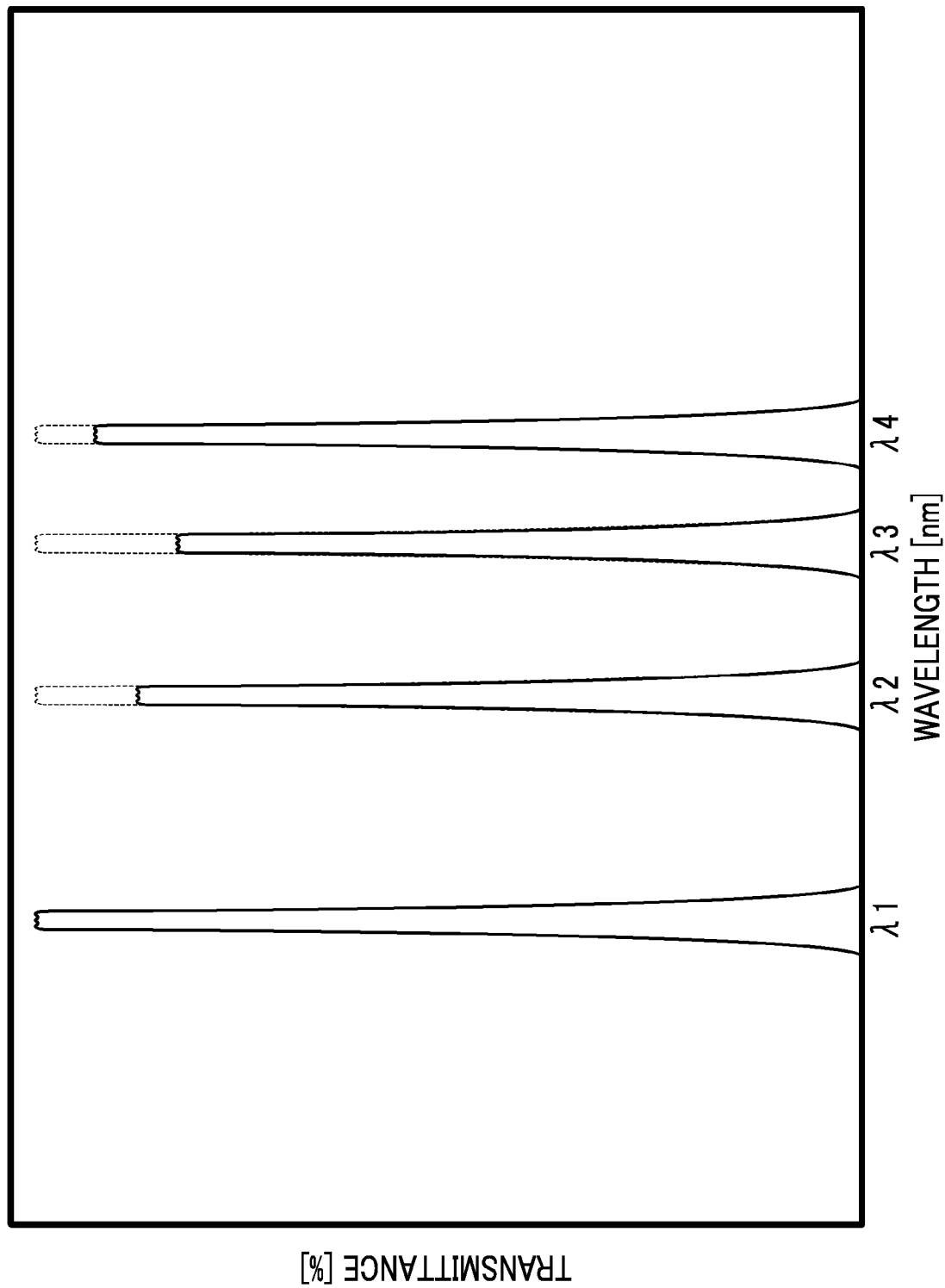
FIG. 32 is a graph showing an example of the transmission wavelength characteristic of each bandpass filter provided in the bandpass filter unit according to the present embodiment.

FIG. 32 is a graph showing an example of the transmission wavelength characteristic of each bandpass filter provided in the bandpass filter unit according to the present embodiment.

As described above, the first bandpass filter 16B1 transmits the light beam of the wavelength range $\lambda 1$. The second bandpass filter 16B2 transmits the light beam of the wavelength range $\lambda 2$. The third bandpass filter 16B3 transmits the light beam of the wavelength range $\lambda 3$. The fourth bandpass filter 16B4 transmits the light beam of the wavelength range $\lambda 4$.

As shown in FIG. 32, the bandpass filters 16B1 to 16B4 transmit the light beams of the wavelength ranges $\lambda 1$ to $\lambda 4$ with different transmittances.

In this way, the transmittances of the bandpass filters 16B1 to 16B4 provided corresponding to the pupil regions Z1 to Z4 can be individually adjusted to individually adjust the amounts of the light beams which pass through the pupil regions Z1 to Z4. As a result, it is possible to obtain a good dynamic range.

In addition, in a case of the adjustment method of the aperture area, in a case in which the aperture area is made too small, the diffraction limit is reduced and a resolution is reduced, but an image having a good resolution can be obtained by controlling the transmittance as in the present embodiment.

Note that the adjustment method according to the present embodiment can also be used in combination with the adjustment method of the aperture area of each of the pupil regions Z1 to Z4.

Seventh Embodiment

In the present embodiment, the bandwidth of the light beam which passes through each of the pupil regions Z1 to Z4 is adjusted to adjust the amount of the light beam which passes through each of the pupil regions Z1 to Z4. The bandwidth of the light beam which passes through each of pupil regions Z1 to Z4 is adjusted by changing the bandwidth of the wavelength transmitted through each of the bandpass filters 16B1 to 16B4.

Figure 33:
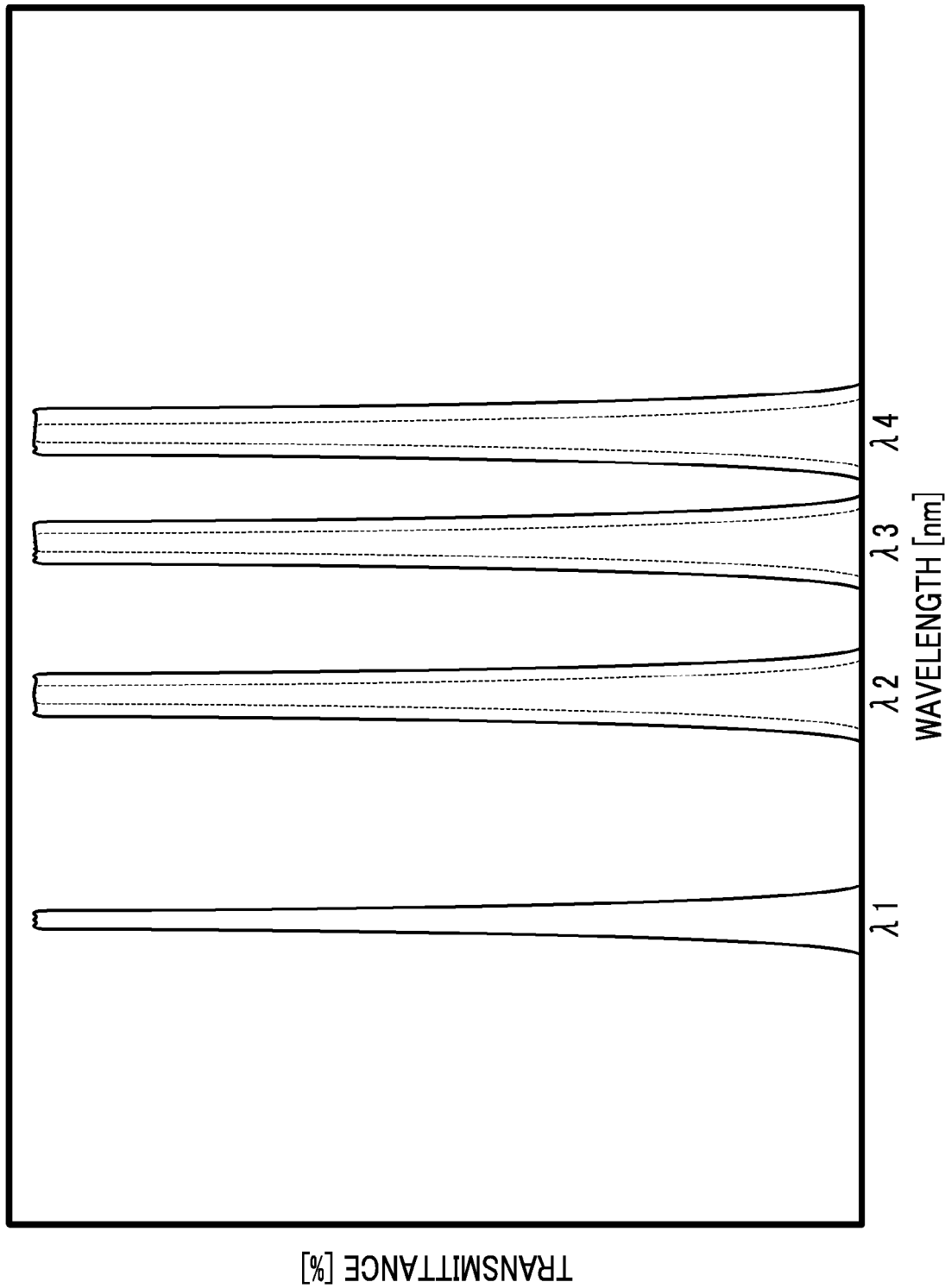
FIG. 33 is a graph showing an example of the transmission wavelength characteristic of each bandpass filter provided in the bandpass filter unit according to the present embodiment.

FIG. 33 is a graph showing an example of the transmission wavelength characteristic of each bandpass filter provided in the bandpass filter unit according to the present embodiment.

As shown in FIG. 33, the bandpass filters 16B1 to 16B4 have different bandwidths of the wavelength ranges $\lambda 1$ to $\lambda 4$ to be transmitted. In the first pupil region Z1, the bandwidth of the wavelength range $\lambda 1$ transmitted through the first bandpass filter 16B1 is adjusted to adjust the amount of the light beam. In the second pupil region Z2, the bandwidth of the wavelength range $\lambda 2$ transmitted through the second bandpass filter 16B2 is adjusted to adjust the amount of the light beam. In the third pupil region Z3, the bandwidth of the wavelength range $\lambda 3$ transmitted through the third bandpass filter 16B3 is adjusted to adjust the amount of the light beam. In the fourth pupil region Z4, the bandwidth of the wavelength range $\lambda 4$ transmitted through the fourth bandpass filter 16B4 is adjusted to adjust the amount of the light beam.

In this way, the bandwidth of the wavelength ranges $\lambda 1$ to $\lambda 4$ transmitted through the bandpass filters 16B1 to 16B4 can be individually adjusted, and the amounts of the light beams which pass through the pupil regions Z1 to Z4 can be individually adjusted. As a result, it is possible to obtain a good dynamic range.

Note that the adjustment method according to the present embodiment can be used in combination with the adjustment method of the aperture area of each of the pupil regions Z1 to Z4 and/or the adjustment method of the transmittance of the light beam transmitted through each of the pupil regions Z1 to Z4.

Other Embodiments

[Regarding Pupil Splitting]

In the embodiments described above, as an example, a case has been described in which the pupil region of the imaging optical system is split into four regions, but the number of splitting is not limited to this. It can be appropriately set in response to the number of bands (N) to be imaged (here, N≥2).

In addition, the splitting aspect is not limited to those shown in the embodiments described above, and other aspects (for example, an aspect of splitting into a grid) can be adopted. Similarly, the aperture shape of each pupil region is not limited to those shown in the embodiments described above, and other shapes can be adopted.

Figure 34:
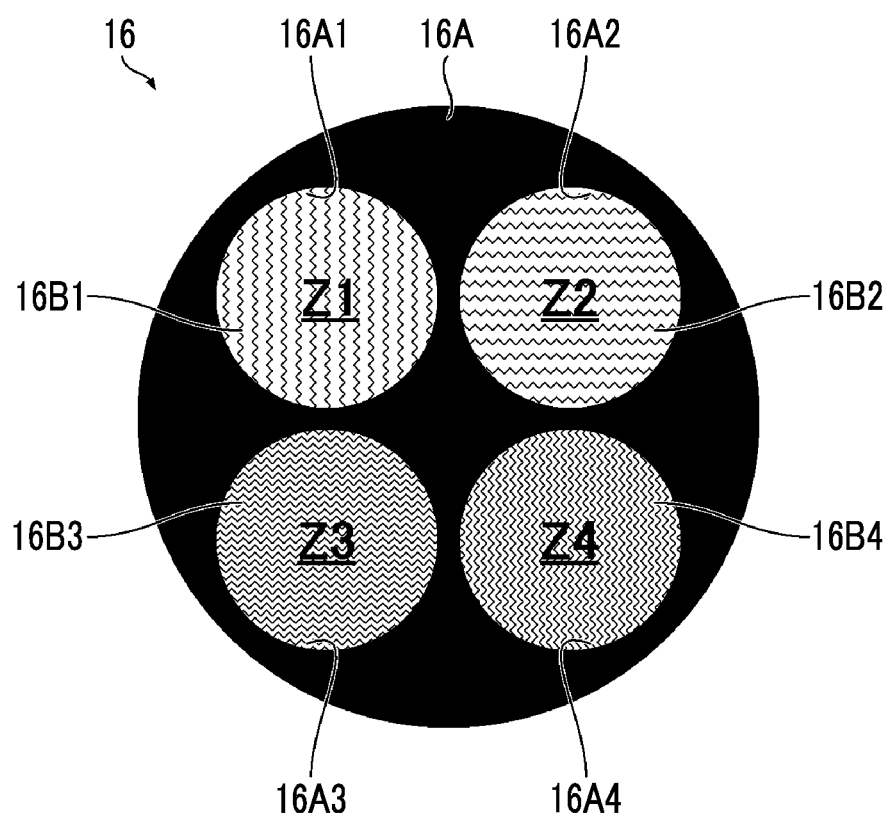
FIG. 34 is a diagram showing another example of an aperture shape of the pupil region.

FIG. 34 is a diagram showing another example of the aperture shape of the pupil region.

FIG. 34 shows an example in which the aperture shape of each pupil region is circular shape. In this case, each of the aperture regions 16A1 to 16A4 of the bandpass filter unit 16 has a circular shape. In addition, as the aperture shape of the pupil region, a rectangular shape, a polygonal shape, or the like can be adopted. In addition, the pupil regions may have different aperture shapes.

In addition, in the embodiments described above, the pupil region is split into a plurality of regions by disposing the bandpass filter at the position of the stop, but it is also possible to substantially split the pupil region into a plurality of regions by disposing the bandpass filter in the vicinity of the stop, and it is possible to limit the wavelength range of the light beam transmitted through each region.

[Regarding Setting of Wavelength Range Transmitted Through Each Pupil Region]

Regarding the wavelength range transmitted through which each splitting pupil region, the wavelength range transmitted through at least one pupil region (first pupil region) and the wavelength range transmitted through the other pupil region (second pupil region) need only be different from each other. Therefore, the pupil region which transmits the light beams of the same wavelength range may be provided.

[Regarding Polarization Direction of Light Beam Transmitted Through Each Pupil Region]

A configuration may be adopted in which the imaging optical system polarizes the splitting pupil regions in a different polarization directions. For example, in the imaging optical system according to the first embodiment, the polarization directions of the light beams transmitted through the polarization filters 18B1 to 18B4 may be different from each other.

[Regarding Case of Capturing Multispectral Image of N Bands]

In a case in which the type of the polarization filter element provided in the imaging element is assumed to n type (n≥2) and the type of the spectral filter element is assumed to m type (m≥2), the imaging apparatus according to the embodiment of the present invention can capture the multispectral image of (n×m) bands at maximum. In this case, in the imaging element, one pixel block is configured by (n×m) pixels having different combinations of the polarization filter element and the spectral filter element.

In a case of capturing the multispectral image of N bands (N is an integer of 2 or more), the imaging optical system is configured to emit the light beams of N bands, and the imaging element is configured to satisfy N≤(n×m).

Here, a case will be considered in which the type of the polarization filter element provided in the imaging element is assumed to n type, the type of the spectral filter element is assumed to m type, n×m=q is satisfied, and one pixel block is configured by q pixels. In this case, q pixel signals α1, α2, . . . , αq are output from each pixel block of the imaging element. In a case in which the imaging optical system emits the light beams of k types of wavelength ranges, the arithmetic equation for removing the interference from the q pixel signals α1, α2, . . . , αq and calculating the pixel signals β1, β2, . . . , βk of the wavelength ranges is defined as follows using the matrix A.

$$A = \begin{bmatrix} a11 & a12 & \ldots & a1q \\ a21 & a22 & \ldots & a2q \\ \vdots & \vdots & \vdots & \vdots \\ ak1 & ak2 & \ldots & akq \end{bmatrix}$$

$$\begin{bmatrix} \beta1 \\ \beta2 \\ \vdots \\ \beta k \end{bmatrix} = \begin{bmatrix} a11 & a12 & \ldots & a1q \\ a21 & a22 & \ldots & a2q \\ \vdots & \vdots & \vdots & \vdots \\ ak1 & ak2 & \ldots & akq \end{bmatrix} * \begin{bmatrix} \alpha1 \\ \alpha2 \\ \vdots \\ \alpha q \end{bmatrix}$$

As described above, the matrix A is the inverse matrix $B^{-1}$ of the matrix B having, as an element, a ratio of the light beam of the wavelength range received by each pixel of the pixel block.

[Regarding Interference Removal Processing]

The signal processing unit can also generate the image data in each wavelength range without performing the interference removal processing. For example, in a case of capturing the multispectral image of two types of wavelength ranges, the pupil region of the imaging optical system is split into the first pupil region and the second pupil region. In the first pupil region, the first bandpass filter which transmits the light beam of the first wavelength range λ1 and the first polarization filter which transmits the light beam of the first polarization direction θ1 are provided. On the other hand, in the second pupil region, the first bandpass filter which transmits the light beam of the second wavelength range λ2 different from the first wavelength range λ1 and the second polarization filter which transmits the light beam of the second polarization direction θ2 orthogonal to the first polarization direction θ1 are provided. The imaging element configures one pixel block with two pixels (first pixel and second pixel). The first pixel comprises the first polarization filter element which transmits the light beam of the first polarization direction θ1. On the other hand, the second pixel comprises the polarization filter element which transmits the light beam of the second polarization direction θ2. As a result, the light beam that passes through the first pupil region is received only by the first pixel, and the light beam that passes through the second pupil region is received only by the second pixel. Therefore, in such a case, the image data of each wavelength range can be generated without performing the interference removal processing. In addition, even in a case in which the interference occurs, in a case in which the influence is small or in a case in which a user recognizes the influence to be acceptable, it is possible to generate the image data in each wavelength range without performing the interference removal processing.

[Modification Example 1 of Bandpass Filter]

In the embodiments described above, the bandpass filters are independently disposed for each splitting pupil region, but a configuration can be adopted in which the bandpass filters corresponding to the pupil regions are integrated to form one bandpass filter.

Figure 35:
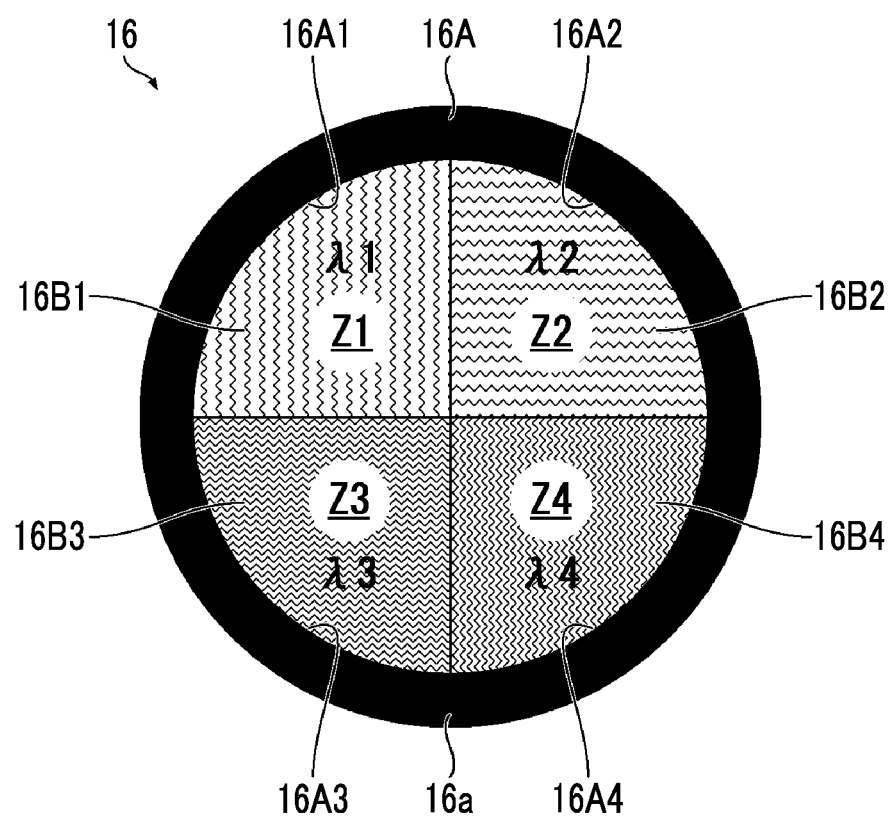
FIG. 35 is a diagram showing an example of a case in which a bandpass filter corresponding to each pupil region is integrated to form one bandpass filter.

FIG. 35 is a diagram showing an example of a case in which the bandpass filter corresponding to each pupil region is integrated to form one bandpass filter.

As shown in FIG. 35, the bandpass filter according to the present embodiment is formed as one bandpass filter by integrating the bandpass filters 16B1 to 16B4 corresponding to the splitting pupil regions Z1 to Z4.

[Modification Example 2 of Bandpass Filter]

In the embodiments described above, the configuration has been adopted in which the light beam of one type of the wavelength range is transmitted through one aperture region, but a configuration can also be adopted in which the light beams of a plurality of types of the wavelength ranges are transmitted through one aperture region. For example, by using the bandpass filter (so-called multi-bandpass filter) which transmits a plurality of types of the wavelength ranges, it is possible to transmit a plurality of types of the wavelength ranges through one aperture region. In this case, the number of wavelength ranges transmitted through one aperture region (the number of transmission wavelength ranges) is the number of types of the spectral filter elements provided in the imaging element, at maximum. That is, the number of the transmission wavelength ranges provided in one aperture region can be set to be less than or equal to the number of the transmission wavelength ranges of the spectral filter element.

[Exchangeable Bandpass Filter Unit]

It is preferable that the imaging optical system have a configuration in which the bandpass filter unit can be exchanged. As a result, it is possible to perform imaging by changing the wavelength range. Note that, as described above, since the imaging apparatus according to the embodiment of the present invention can capture the multispectral image of n×m bands at maximum (n is the type of the polarization filter element provided in the imaging element and m is the type of the spectral filter element), it is possible to perform imaging by changing the number of bands within the range of n×m.

It is preferable that the bandpass filter unit have a configuration in which the bandpass filter is attachably and detachably held for each aperture region. As a result, it is possible to simply capture the multispectral image of any wavelength range by only exchanging the bandpass filter.

Note that as in the present embodiment, it is preferable to use the spectral filter element which transmits the light beam of a wide range as the spectral filter element provided in the imaging element in consideration of enabling switching of the wavelength range. That is, it is preferable to use the spectral filter element that covers a selectable transmission wavelength range.

[Aberration Correction by Other Optical Elements]

In the embodiments described above, the configuration has been adopted in which the aberration of the region corresponding to each pupil region is individually corrected by the bandpass filter provided corresponding to each pupil region, but a configuration may be adopted in which the aberration of the region corresponding to each pupil region is individually corrected by an optical element different from the bandpass filter. By correcting the aberration of the region corresponding to each pupil region by the bandpass filter, it is possible to reduce the number of parts and it is possible to simplify the configuration.

[Configuration of Imaging Element]

The arrangement of the pixels configuring one pixel block is not limited to that of each of the embodiments described above. The arrangement of the pixels can be appropriately changed in response to the number of pixels configuring one pixel block and the like.

In addition, in the embodiments described above, the configuration has been adopted in which the polarization filter element and the spectral filter element are disposed between the photodiode and the micro lens, but a configuration can be adopted in which one or both of the polarization filter element and the spectral filter element are disposed in front of the micro lens (subject side). Note that by disposing the polarization filter element and the spectral filter element between the micro lens and the photodiode, it is possible to effectively prevent the light beams from being mixed into adjacent pixels. As a result, the interference can be further prevented.

In addition, a configuration may be adopted in which the polarization filter element provided in each pixel of one pixel block transmit the light beams of polarization directions different from each other. For example, in the imaging element according to the first embodiment, the polarization directions of the light beams transmitted through the polarization filter elements provided in the pixels P1 to P16 may be different from each other.

[Configuration of Signal Processing Unit]

The function of the image generation unit 200B (arithmetic unit) in the signal processing unit 200 can be realized by using various processors. The various processors include, for example, a central processing unit (CPU), which is a general-purpose processor that executes software (program) to realize various functions. In addition, the various processors described above also include a graphics processing unit (GPU), which is a processor specialized in the image processing and a programmable logic device (PLD), which is a processor of which a circuit configuration can be changed after manufacturing such as a Field Programmable Gate Array (FPGA). Further, the various processors described above also include a dedicated electric circuit, which is a processor having a circuit configuration specially designed for executing specific processing, such as an application specific integrated circuit (ASIC).

The functions of the units may be realized by one processor, or may be realized by a plurality of processors of the same type or different types (for example, a plurality of FPGAs, or a combination of the CPU and the FPGA, or a combination of the CPU and the GPU). In addition, a plurality of the functions may be realized by one processor. As an example of configuring a plurality of functions with one processor, first, as represented by a computer such as a server, there is a form in which one processor is configured by a combination of one or more CPUs and software, and the processor realizes a plurality of functions. Second, as represented by a system on chip (SoC), there is a form in which a processor is used in which the functions of the entire system are realized by a single integrated circuit (IC) chip. In this way, the various functions are configured by one or more of the above various processors as a hardware structure. Further, the hardware structure of these various processors is, more specifically, an electric circuit (circuitry) in which the circuit elements such as semiconductor elements are combined. These electric circuits may be electric circuits that realize the functions described above by using logical sum, logical product, logical denial, exclusive logical sum, and logical operations combining the above.

In a case in which the processor described above or the electric circuit executes software (program), the processor (computer) readable code of the software to be executed is stored in a non-transitory recording medium such as a read only memory (ROM), and the processor refers to the software. The software stored in the non-transitory recording medium includes a program for executing image input, analysis, display control, and the like. The code may be recorded on the non-transitory recording medium such as various optical magnetic recording devices, a semiconductor memory, and the like, instead of the ROM. In a case of processing using the software, for example, a random access memory (RAM) can be used as a transitory storage region, and for example, refer to data stored in an electronically erasable and programmable read only memory (EEPROM) (not shown).

The coefficient storage unit 200C of the signal processing unit 200 can be realized by, for example, a memory such as the read-only memory (ROM), the electrically erasable programmable read-only memory (EEPROM), and the like.

[Configuration of Imaging Apparatus]

The imaging apparatus can also be configured as an interchangeable lens type imaging apparatus in which the imaging optical system can be exchanged. In this case, since the matrix A is uniquely determined for each lens (imaging optical system), the matrix A is prepared for each lens, and the coefficient group thereof is stored in the coefficient storage unit. In a case in which the lens is exchanged, the coefficient group of the matrix A corresponding to the exchanged lenses is read out from the coefficient storage unit, the arithmetic processing is executed, and each image is generated.

EXPLANATION OF REFERENCES

1: imaging apparatus
10: imaging optical system
12: lens
16: bandpass filter unit
16A: frame
16A1: first aperture region
16A2: second aperture region
16A3: third aperture region
16A4: fourth aperture region
16B1: first bandpass filter
16B2: second bandpass filter
16B3: third bandpass filter
16B4: fourth bandpass filter
16a: frame body
16b: partition
18: polarization filter unit
18A: frame
18A1: first aperture region
18A2: second aperture region
18A3: third aperture region
18A4: fourth aperture region
18B1: first polarization filter
18B2: second polarization filter
18B3: third polarization filter
18B4 fourth polarization filter
18a: frame body
18b: partition
100: imaging element
110: pixel array layer
112: photodiode
120: polarization filter element array layer
122A: first polarization filter element
122B: second polarization filter element
122C: third polarization filter element
122D: fourth polarization filter element
130: spectral filter element array layer
132A: first spectral filter element
132B: second spectral filter element
140: micro lens array layer
142: micro lens
200: signal processing unit
200A: analog signal processing unit
200B: image generation unit
200C: coefficient storage unit
D1 to D16: image data
L: optical axis
P1: first pixel
P2: second pixel
P3: third pixel
P4: fourth pixel
P5: fifth pixel
P6: sixth pixel
P7: seventh pixel
P8: eighth pixel
P9: ninth pixel
P10: tenth pixel
P11: eleventh pixel
P12: twelfth pixel
P13: thirteenth pixel
P14: fourteenth pixel
P15: fifteenth pixel
P16: sixteenth pixel
PB: pixel block
Z1: first pupil region
Z2: second pupil region
Z3: third pupil region
Z4: fourth pupil region
$\theta 1$: polarization direction
$\theta 2$: polarization direction
$\theta 3$: polarization direction
$\theta 4$: polarization direction
$\theta A$: polarization direction
$\theta B$: polarization direction
$\theta C$: polarization direction
$\theta D$: polarization direction
$\lambda 1$: wavelength range
$\lambda 2$: wavelength range
$\lambda 3$: wavelength range
$\lambda 4$: wavelength range
A: transmission wavelength characteristic of first spectral filter element
B: transmission wavelength characteristic of second spectral filter element
C: transmission wavelength characteristic of third spectral filter element
D: transmission wavelength characteristic of fourth spectral filter element

What is claimed is:
1. An imaging apparatus comprising:
an imaging optical system that includes a pupil region which is split into a plurality of regions including a first pupil region and a second pupil region different from the first pupil region, and a polarizer which polarizes light beams passing through the first pupil region and the second pupil region in directions different from each other;
an imaging element that includes a first pixel which receives the light beam passing through the first pupil region and a second pixel which receives the light beam passing through the second pupil region; and
a processor that processes signals output from the imaging element, and outputs at least first image data consisting of an output signal of the first pixel and second image data consisting of an output signal of the second pixel,
wherein in the imaging optical system, wavelengths of the light beams passing through the first pupil region and the second pupil region are different from each other, and aberration characteristics of regions corresponding to the first pupil region and the second pupil region are different from each other.
2. The imaging apparatus according to claim 1,
wherein in the imaging optical system, amounts of the light beams passing through the first pupil region and the second pupil region are different from each other.
3. The imaging apparatus according to claim 1,
wherein the imaging optical system includes a first optical element disposed in the first pupil region and a second optical element disposed in the second pupil region, which is different from the first optical element, and aberrations of the regions corresponding to the first pupil region and the second pupil region are individually corrected by the first optical element and the second optical element.

4. The imaging apparatus according to claim 3,
wherein the first optical element transmits a light beam of a first wavelength range, and
the second optical element transmits a light beam of a second wavelength range different from the first wavelength range.

5. The imaging apparatus according to claim 4,
wherein the first optical element has a first transmittance, and
the second optical element has a second transmittance different from the first transmittance.

6. The imaging apparatus according to claim 3,
wherein the first optical element has a first aperture area, and
the second optical element has a second aperture area different from the first aperture area.

7. The imaging apparatus according to claim 3,
wherein the first optical element and the second optical element have a lens shape, and
in the imaging optical system, curvatures of the first optical element and the second optical element are individually adjusted to individually correct the aberrations of the regions corresponding to the first pupil region and the second pupil region.

8. The imaging apparatus according to claim 3,
wherein the first optical element and the second optical element have a flat plate shape, and
in the imaging optical system, thicknesses of the first optical element and the second optical element are individually adjusted to individually correct the aberrations of the regions corresponding to the first pupil region and the second pupil region.

9. The imaging apparatus according to claim 3,
wherein the first optical element and the second optical element have a flat plate shape, and
in the imaging optical system, inclinations of the first optical element and the second optical element are individually adjusted to individually correct the aberrations of the regions corresponding to the first pupil region and the second pupil region.

10. The imaging apparatus according to claim 3,
wherein the first optical element and the second optical element have a flat plate shape, and
in the imaging optical system, inclinations of one surface of the first optical element and one surface of the second optical element are individually adjusted to individually correct the aberrations of the regions corresponding to the first pupil region and the second pupil region.

11. The imaging apparatus according to claim 3,
wherein the first optical element and the second optical element are integrated to form one optical element.

12. The imaging apparatus according to claim 1,
wherein in the imaging optical system, the pupil region is split concentrically.

* * * * *